(12) United States Patent
Li et al.

(10) Patent No.: US 12,507,137 B2
(45) Date of Patent: Dec. 23, 2025

(54) METHODS AND DEVICES FOR ASSISTING CELL RESELECTION AND PAGING

(71) Applicant: ZTE Corporation, Shenzhen (CN)

(72) Inventors: Wenting Li, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 640 days.

(21) Appl. No.: 17/668,517

(22) Filed: Feb. 10, 2022

(65) Prior Publication Data
US 2022/0167228 A1     May 26, 2022

Related U.S. Application Data

(63) Continuation of application No. PCT/CN2019/100779, filed on Aug. 15, 2019.

(51) Int. Cl.
*H04W 36/00* (2009.01)
*H04W 68/00* (2009.01)
H04W 84/10 (2009.01)

(52) U.S. Cl.
CPC ....... *H04W 36/0077* (2013.01); *H04W 68/00* (2013.01); *H04W 84/105* (2013.01)

(58) Field of Classification Search
CPC ............. H04W 36/0077; H04W 68/00; H04W 84/105
See application file for complete search history.

(56) References Cited

U.S. PATENT DOCUMENTS

| 2010/0113009 A1* | 5/2010 | Jeong | H04W 36/0094 455/423 |
| 2011/0216732 A1* | 9/2011 | Maeda | H04W 4/08 370/329 |
| 2011/0244869 A1* | 10/2011 | Olofsson | H04W 68/00 455/442 |
| 2011/0269465 A1 | 11/2011 | Lixiang et al. | |

(Continued)

FOREIGN PATENT DOCUMENTS

| CN | 101854633 A | 10/2010 |
| CN | 101990234 A | 3/2011 |

(Continued)

OTHER PUBLICATIONS

Extended European Search Report regarding EP 19 94 1478 dated Nov. 7, 2022, 12 pages.

(Continued)

*Primary Examiner* — Kenny S Lin
(74) *Attorney, Agent, or Firm* — Crowell & Moring LLP

(57) ABSTRACT

Method, systems and devices for wireless communication. The method includes receiving, by a user equipment (UE), a dedicated signal comprising physical cell identifier (PCI) range information and determining whether a preset condition has occurred. In response to determining that the preset condition has occurred, the method includes setting, by the UE, the PCI range information in the dedicated signal as invalid. In response to determining that the preset condition has not occurred, the method includes replacing, by the UE, previously received PCI range information by the PCI range information in the dedicated signal, and using the PCI range information in the dedicated signal to assist cell reselection.

6 Claims, 24 Drawing Sheets

(56) References Cited

U.S. PATENT DOCUMENTS

| | | | | |
|---|---|---|---|---|
| 2013/0083744 | A1* | 4/2013 | Peng | H04W 52/0235 |
| | | | | 370/329 |
| 2013/0182583 | A1* | 7/2013 | Siomina | H04W 24/00 |
| | | | | 370/252 |
| 2013/0235746 | A1* | 9/2013 | Patel | H04W 16/16 |
| | | | | 370/252 |
| 2015/0024743 | A1* | 1/2015 | Zheng | H04W 48/16 |
| | | | | 455/434 |
| 2015/0382254 | A1* | 12/2015 | Pakniat | H04W 36/04 |
| | | | | 370/331 |
| 2016/0007260 | A1 | 1/2016 | Abraham et al. | |
| 2018/0352488 | A1 | 12/2018 | Selvaganapathy et al. | |
| 2019/0364534 | A1* | 11/2019 | Ginsburg | H04W 76/11 |
| 2021/0160749 | A1* | 5/2021 | Lu | H04W 36/00835 |
| 2022/0256416 | A1* | 8/2022 | Sharma | H04W 36/0061 |

FOREIGN PATENT DOCUMENTS

| | | |
|---|---|---|
| CN | 103313328 A | 9/2013 |
| CN | 103026777 B | 4/2016 |
| CN | 110536331 A | 12/2019 |
| EP | 2 320 693 | 5/2011 |
| WO | WO 2015/020468 | 2/2015 |
| WO | WO 2018/031802 | 2/2018 |

OTHER PUBLICATIONS

First Communication issued by the European Patent Office regarding 19 941 478.0 dated Aug. 13, 2024, 5 pages.

Indian Office Action regarding 202217007376 dated Aug. 1, 2022, 5 pages.

International Search Report and Written Opinion regarding PCT/CN2019/100779 dated Mar. 31, 2020, 9 pages.

Motorola. "CSG PCI Range Validity," *3GPP TSG-RAN WG2#64bis R2-090358*, Jan. 16, 2009 (Jan. 16, 2009), sections 2-3.

CATT. "Discussion on FI SETUP procedure," *3GPP TSG-RAN WG3 Meeting #97bis R3-173595*, Oct. 13, 2017, sections 2-5.

China Telcom. "Motivation for new WI Proposal on NPN support for NR," *3GPP TSG RAN Meeting #83 RP-190250*, Mar. 21, 2019, section 2.

ZTE. "Consideration on support CAG in NR," *3GPP TSG-RAN WG3 #103 R3-19026*, Mar. 1, 2019, section 2, figure 3.

Intel Corporation. "RAN2 impact on Non-Public Network Deployment using SNPN," *3GPP TSG RAN WG2 Meeting #105 R2-1900760*, Mar. 1, 2019.

Intel Corporation. "RAN2 impact on Non-Public Network Deployment using CAG" *3GPP TSG RAN WG2 Meeting #105 R2-1900761*, Mar. 1, 2019.

Australian Examination Report regarding 2019461142 dated Feb. 14, 2023, 4 pages.

European Supplementary Search Report (partial) regarding EP 19 94 1478 dated Jul. 28, 2022, 12 pages.

Chinese-language Office Action with English translation issued in Application No. 201980099333.5 dated Jun. 5, 2025 (18 pages).

Chinese Notification of Registration and Grant with English translation issued in Chinese Application No. 201980099333.5 dated Nov. 12, 2025, (9 pages).

LG Electronics, Inc., "Applicable Scope of PCI/PSC range of CSG cells," 3GPP TSG-RAN WG2, #75bis R2-115448, dated Oct. 4, 2011, 15 pp. 1-9.

* cited by examiner transferring an configuration update message on the interface between the central unit and the distributed unit

440

FIG. 4B configuring the PCI information based on at least one of a list of information.

450

FIG. 4C providing the SNPN ID information

Sending paging information from a central unit to a distributed unit
470 transferring an configuration update message on the interface between the central unit and the distributed unit
640

FIG. 6B configuring the PCI information based on at least one of a list of information.
650

FIG. 6C

Sending paging information from a central unit to a distributed unit
660

FIG. 6D

1000 sending the list of at least one SNPN, the list of at list one allowed CAG, or the PCI range information from the source RAN node to the target RAN node
1010

FIG. 10A sending new PCI range information from the target RAN node to a UE
1020

FIG. 10B sending paging information from a RAN node to one or more other RAN nodes according to the list of at least one SNPN, the list of at list one allowed CAG, or the PCI range information
1030

```
receiving, by a user equipment (UE), a dedicated signal comprising physical cell
identifier (PCI) range information
                                                                            1410
```
↓
```
replacing, by the UE, previously received PCI range information by the PCI range
information in the dedicated signal
                                                                            1420
```
↓
```
using, by the UE, the PCI range information in the dedicated signal to assist cell
reselection
                                                                            1430
```
↓
whether a preset condition has occurred?
1440

Yes
↓
```
setting, by the UE, the PCI range information in the dedicated signal as invalid
                                                                            1450
```

```
setting, by the UE, a range of PCIs in the PCI range information as candidate cells
                                                                              1510
```

```
obtaining, by the UE, ranking information for each cell in the candidate cells
                                                                              1520
```

```
ranking, by the UE, the candidate cells based on the ranking information and check
the accessibility from the best ranked cell, ignore the cell from the candidates to
obtain modified candidate cells when it fails the accessibility check   1530
```

```
obtaining, by the UE, a cell with best rank in the modified candidate cells and
matched private network ID (e.g, SNPN ID or CAG ID) as the cell reselection
                                                                              1540
```

FIG. 15 for any CAG cell that is known by the UE not to be a CAG member cell, excluding the CAG cell from the candidate cells during ranking the candidate cells
1610

FIG. 16A for any SNPN cell that is known by the UE not to be a member cell of the SNPN, excluding the SNPN cell from the candidate cells during ranking the candidate cells
1620

FIG. 16B for any SNPN cell that is known by the UE not allowed to access, excluding the SNPN cell from the candidate cells during ranking the candidate cells
1630

FIG. 16C

METHODS AND DEVICES FOR ASSISTING CELL RESELECTION AND PAGING

CROSS-REFERENCE TO RELATED APPLICATION

This application is a continuation application of PCT International Patent Application No. PCT/CN2019/100779, filed with the China National Intellectual Property Administration, PRC on Aug. 15, 2019, which is herein incorporated by reference in its entirety.

TECHNICAL FIELD

The present disclosure is directed generally to wireless communications. Particularly, the present disclosure relates to methods for assisting cell reselection and paging.

BACKGROUND

Wireless communication technologies are moving the world toward an increasingly connected and networked society. High-speed and low-latency wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. In order to fulfil the low latency and high reliability requirements for the vertical industry as well as support the new generation network service, a dedicated wireless network, i.e., private network, attracts attention.

SUMMARY

This document relates to methods, systems, and devices for wireless communication, and more specifically, for assisting cell reselection and paging.

In one embodiment, the present disclosure describes a method for wireless communication. The method includes transferring information of a private network on an interface between a central unit and a distributed unit by performing obtaining the information of the private network; sending a setup request from the distributed unit to the central unit; and sending a setup response based on the setup request from the central unit to the distributed unit.

In another embodiment, the present disclosure describes another method for wireless communication. The method includes transferring a list of at least one private network identifier (ID), or physical cell identifier (PCI) range information on an interface between a radio access network (RAN) node and a core network (CN) node by performing obtaining the PCI range information; sending the PCI range information from the RAN node to the CN node; and sending paging information from the CN node to the RAN node.

In another embodiment, the present disclosure describes another method for wireless communication. The method includes transferring a list of at least one private network identifier (ID) or physical cell identifier (PCI) range information on an interface between a source radio access network (RAN) node and a target RAN node by performing sending the list of at least one private network ID or the PCI range information from the source RAN node to the target RAN node.

In another embodiment, the present disclosure describes another method for wireless communication. The method includes transferring physical cell identifier (PCI) range information in a dedicated signal between a radio access network (RAN) node and a user equipment by performing: obtaining the PCI range information; and sending the dedicated signal from the RAN node to the user equipment, wherein the dedicated signal comprises the PCI range information.

In another embodiment, the present disclosure describes another method for wireless communication. The method includes receiving, by a user equipment (UE), a dedicated signal comprising physical cell identifier (PCI) range information; replacing, by the UE, previously received PCI range information by the PCI range information in the dedicated signal; using, by the UE, the PCI range information in the dedicated signal to assist cell reselection; determining, by the UE, whether a preset condition has occurred; and in response to determining that the preset condition has occurred, setting, by the UE, the PCI range information in the dedicated signal as invalid.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4B shows a flow diagram of a method for wireless communication.

FIG. 4C shows a flow diagram of a method for wireless communication.

FIG. 4D shows a flow diagram of a method for wireless communication.

FIG. 6B shows a flow diagram of a method for wireless communication.

FIG. 6C shows a flow diagram of a method for wireless communication.

FIG. 6D shows a flow diagram of a method for wireless communication.

FIG. 10A shows a flow diagram of a method for wireless communication.

FIG. 10B shows a flow diagram of a method for wireless communication.

FIG. 10C shows a flow diagram of a method for wireless communication.

FIG. 14 shows a flow diagram of a method for wireless communication.

FIG. 15 shows a flow diagram of a method for wireless communication.

FIG. 16A shows a flow diagram of a method for wireless communication.

FIG. 16B shows a flow diagram of a method for wireless communication.

FIG. 16C shows a flow diagram of a method for wireless communication.

DETAILED DESCRIPTION

Figure 1:
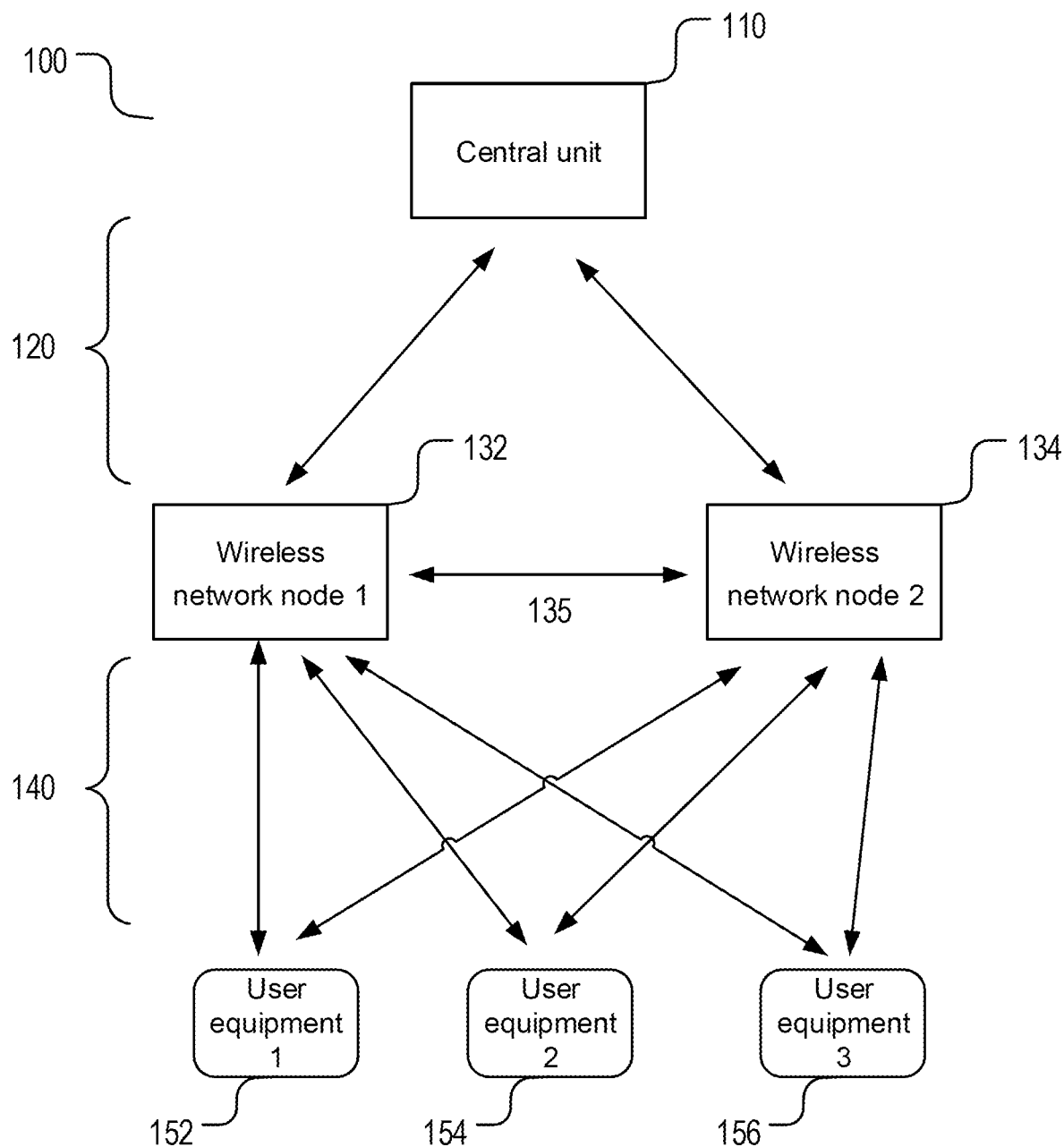
FIG. 1 shows an example of a wireless communication system include a central network, one or more wireless network node, and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for assisting cell reselection and paging. The present disclosure addresses the issues with existing methods wherein during the reselection by a stand-alone non-public network (SNPN) user equipment (UE), the UE may need to read the master information block/system information block 1 (MIB/SIB1) of the higher ranked cells to check whether these cells are belong to the NPN member and thus may increase UE power consumption and prolong re-selection interval.

5G network is expected to provide high speed, low latency and ultra-reliable communication capabilities and fulfil the requirements from different industries and users. In order to fulfil the low latency and high reliability requirements for the vertical industry as well as support 5G LAN-type service, a dedicated wireless network, i.e., private network, attracts attention and may be employed.

A Non-Public Network (NPN) is a 5GS deployed for non-public use. In one implementation, an NPN may be employed as a Stand-alone Non-Public Network (SNPN), i.e., operated by an NPN operator and not relying on network functions provided by a public land mobile network (PLMN). In another implementation, an NPN may be employed as a Public network integrated NPN, i.e., a non-public network deployed with the support of a PLMN.

A public network integrated NPN may be made available by means of, e.g., dedicated data network names (DNNs) or by one or more single network slice selection assistance informations (S-NSSAIs) allocated for it. A closed access group (CAG) may be optionally used in order to prevent user equipment (UEs) not allowed to access a public network integrated NPN from accessing the public network integrated NPN. The important enablers for the CAG in the non-access stratum (NAS) layer may include a CAG selection and provisioning of an allowed CAG list and, optionally, an indication that the UE is only allowed to access 5GS via CAG cells from network to UE via the generic UE configuration update procedure.

The existing non-public network procedures may be limited to support vertical and local area network (LAN) Services, from operator points of view, the solutions of public network integrated NPN may also be applicable for a much wider range of use cases, such as small office home office (SOHO) and residential, private network coverage deployments and so on.

Enhancements to the 5G system to support NPN may need to introduce new types of network identifiers (ID) for non-public networks, which may include Non-public network ID (NPN ID) and Closed Access Group (CAG) ID. To implement these private network functions on the radio access network (RAN) side, the following features/functions, such as non-public network identification, discovery, selection/reselection and access control, the non-public network related enhancements to mobility restrictions, the non-public network related enhancements to Xn and NG interfaces, may need to be supported.

The existing issues in the SNPN scenario may be described as below. In the SNPN scenario, the UE may only access the SNPN cell with the matched ID. When a same method is adopted for the SNPN cell, during the reselection, the SNPN UEs may ignore physical cell IDs (PCIs) that out of a reserved PCI range. Then the UE may execute the cell reselection among the cells with the matched PCI, and read the system information to check accessibility. Thus, the UE may need to read the MIB/SIB1 of the higher ranked cells to check whether these cells are belong to the NPN member. This prolonged process may lead to higher UE power consumption and increase re-selection interval.

The present disclosure describes methods and devices for assisting cell reselection and paging, thus addressing at least one of the existing issues described above.

FIG. 1 shows a wireless communication system 100 including one or more wireless network node (132 and 134) and one or more user equipment (UE) (152, 154, and 156). The wireless network node may be a base station, which may be a nodeB (NB, e.g., an eNB or gNB) in a mobile telecommunications context. Each of the UE may wirelessly communicate with the wireless network nodes via a plurality of radio channels 140. For example, a first UE 152 may wirelessly communicate with a first wireless network node 132 via a channel including a plurality of radio channels during a certain period of time, and the first UE 152 may also wirelessly communicate with a second wireless network node 134 via a channel including a plurality of radio channels during a certain period of time. Likewise, a second UE 154 and a third UE 156 may wirelessly communicate with the first and second wireless network nodes. The first wireless network node 132 and the second wireless network node 134 may communicate to each other via one or more channel 135.

In one implementation, referring to FIG. 1, the wireless communication system 100 may include another base station which functions as a central unit (CN) 110. The CN 110 may communicate with one or more wireless network node that functions as a distributed unit (DU) via one or more channel 120.

Figure 2:
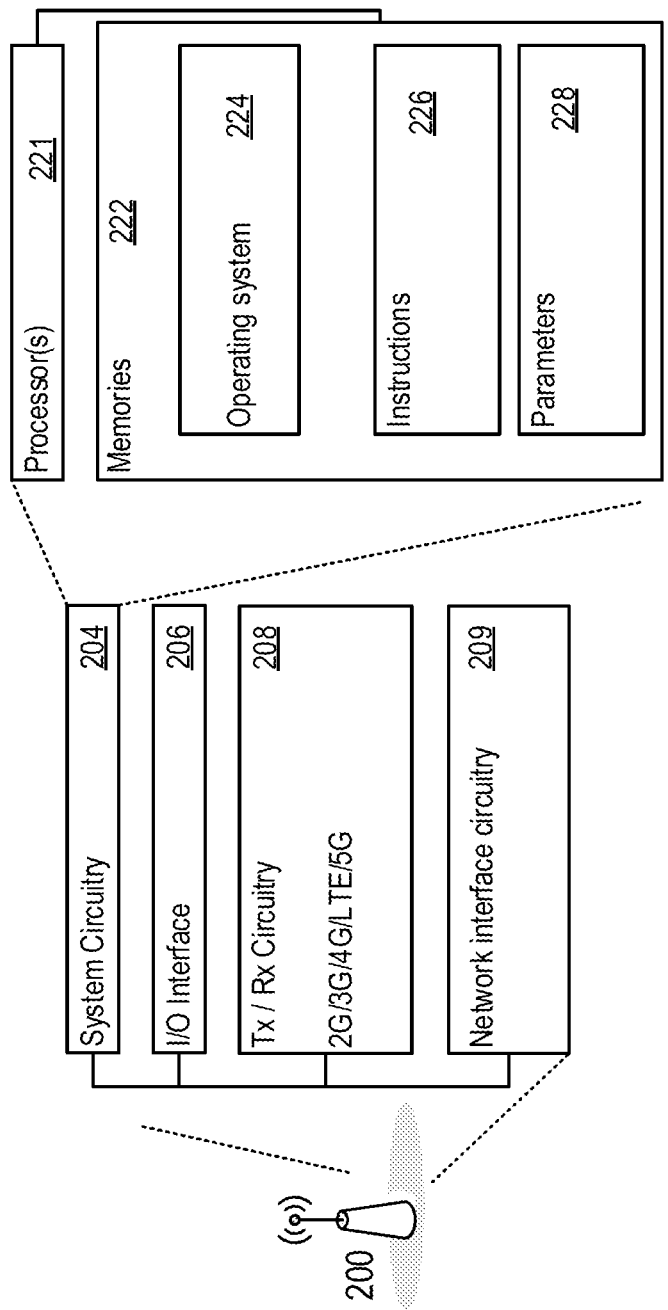
FIG. 2 shows an example of a network node.

FIG. 2 shows an example base station 200. The example base station may include radio Tx/Rx circuitry 208 to receive and transmit with UEs and/or other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to preform the functions of the base station. The parameters 228 may include parameters to support execution of the instructions 226. For example, parameters may include network protocol settings, bandwidth parameters, radio frequency mapping assignments, and/or other parameters.

Figure 3:
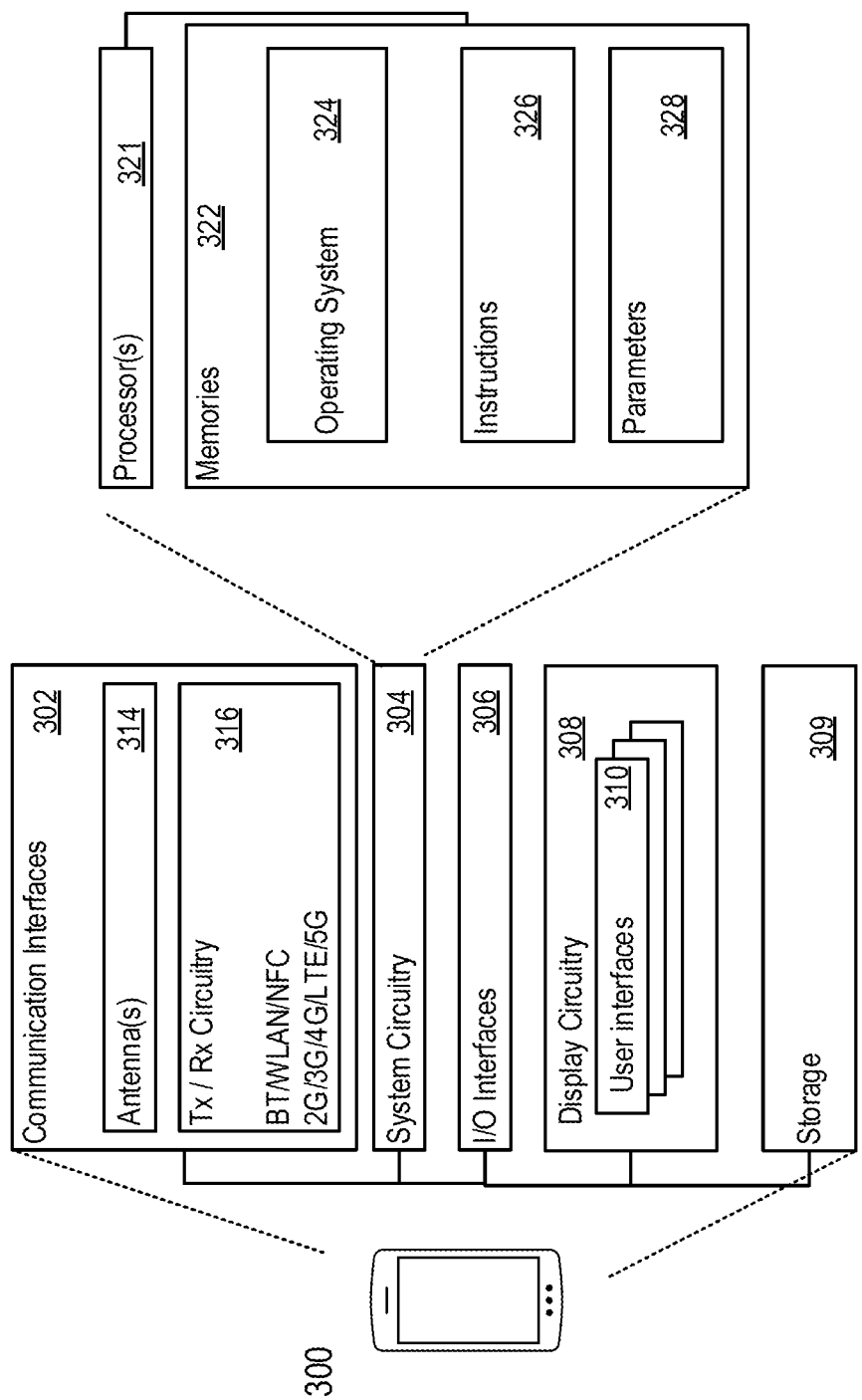
FIG. 3 shows an example of an user equipment.

FIG. 3 shows an example UE 300. The UE 300 may be a mobile device, for example, a smart phone. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above.

Embodiment #1: Transfer SNPN or CAG Information on an Interface Between a Central Unit (CU) and a Distributed Unit (DU)

The present disclosure describe an embodiment of a method for transferring information of a stand-alone non-public network (SNPN) on an interface between a central unit (CU) and a distributed unit (DU). The method may be performed by a network including the CU and the DU. the network may optionally include more than one DUs.

Figure 4A:
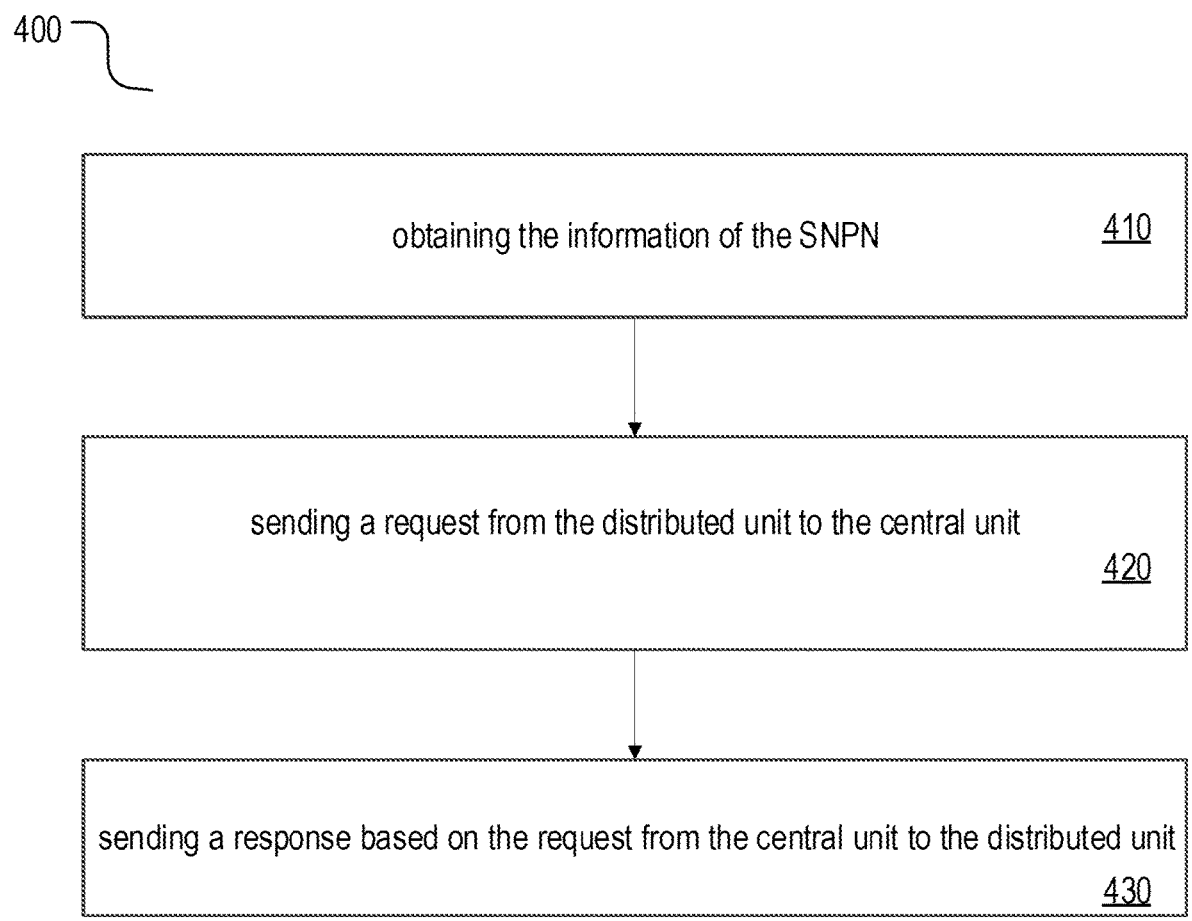
FIG. 4A shows a flow diagram of a method for wireless communication.

Referring to FIG. 4A, the method 400 may include step 410: obtaining the information of the SNPN; step 420: sending a request from the distributed unit to the central unit; and step 430: sending a response based on the request from the central unit to the distributed unit.

Figures 4E, 5:
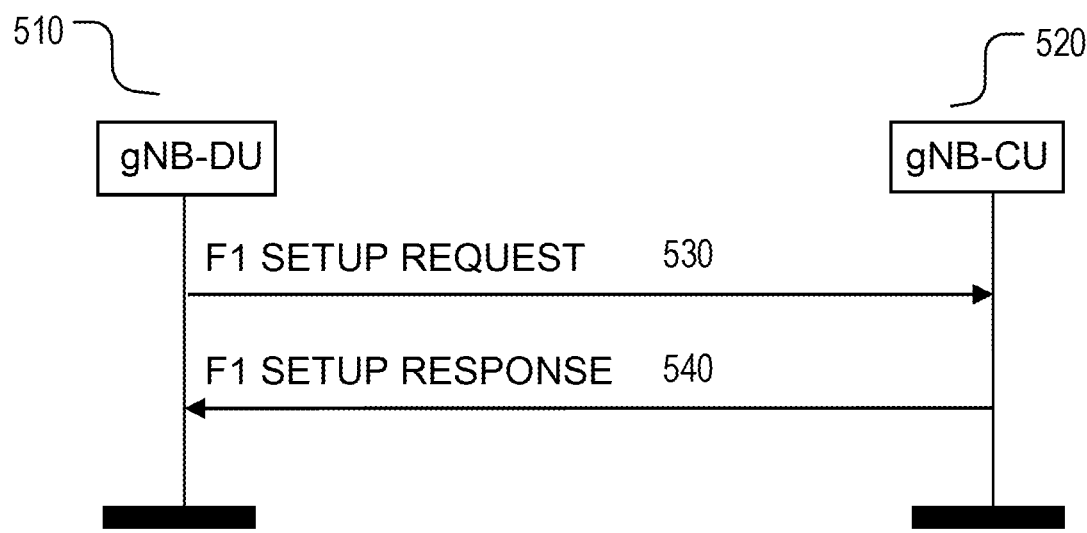
FIG. 4E shows a flow diagram of a method for wireless communication.
FIG. 5 shows a schematic diagram of one embodiment for transferring information between a central unit and a distributed unit.

Referring to FIG. 5, a DU may include a gNB-DU 510, and a CU may include a gNB-CU 520. The gNB-DU 510 may send a F1 setup request 530 to the gNB-CU 520. The F1 setup request may include a first portion of the information of the SNPN. For one example, the F1 setup request may include at least one elements in Table 1. The gNB-CU 520 may send a F1 setup response 540 to the gNB-DU 510. The F1 setup response may depend on the F1 setup request. The F1 setup response may include a second portion of the information of the SNPN. For one example, the F1 setup response may include at least one elements in Table 2.

TABLE 1

An example of F1 Setup Request

| IE/Group Name | Presence | Range | IE type and reference | Semantics description |
|---|---|---|---|---|
| NR CGI | M | | 9.3.1.12 | |
| ... | | | | |
| ... | | | | |
| ... | | | | |
| Served SNPNs | | 1 ... <maxnoofB SNPNs> | | Broadcast SNPNs |
| >PLMN Identity | M | | 9.3.1.14 | |
| >SNPN NID list | | | | |
| Served CAG List | | 1 ... <maxnoofB CAGs> | | Broadcast CAGs |
| >PLMN Identity | M | | 9.3.1.14 | |
| >CAG ID list | | | | |
| Neighbor SNPNs | | 1 ... <maxnoofN SNPNs> | | Neighbor SNPNs |
| >PLMN Identity | M | | 9.3.1.14 | |
| >SNPN NID list | | | | |
| Neighbor CAG List | | 1 ... <maxnoofN CAGs> | | Neighbor CAGs |
| >PLMN Identity | M | | 9.3.1.14 | |
| >CAG ID list | | | | |

Referring to FIG. 4B, the method 400 may optionally include step 440: transferring an configuration update message on the interface between the central unit and the distributed unit. The configuration update message may include same or different information as the setup request or the setup response.

TABLE 2

An example of F1 Setup Response

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | PrintableString (SIZE(1..150,...)) | Human readable name of the gNB-CU. | YES | ignore |
| Cells to be Activated List | | 0.. 1 | | | YES | reject |
| >Cells to be Activated List Item | | 1.. <maxCellingNBDU> | | List of cells to be activated | EACH | reject |
| ... | | | | | | |

TABLE 2-continued

An example of F1 Setup Response

| IE/Group Name | Presence | Range | IE type and reference | Semantics description | Criticality | Assigned Criticality |
|---|---|---|---|---|---|---|
| >>Available SNPN List | O | | | | YES | ignore |
| >>Available CAG List | O | | | | YES | ignore |

In step 410, as shown in Tables 1 and 2, the information of the SNPN may include at least one of the following:
- SNPN identifier (SNPN ID) information for at least one served cell,
- SNPN ID information for at least one neighbor cell,
- physical cell identifier (PCI) information for the SNPN, or
- synchronisation signal block measurement timing configuration (SMTC) information for the SNPN.

In one implementation, the PCI information for the SNPN may include information for each SNPN ID, or information for all SNPN cells.

In another implementation, the PCI information for the SNPN may include PCI range information, for example, a list of PCIs, a range of PCIs, or a list of ranges of PCIs. For one example, the PCI range information may include PCI range for all of the SNPN as shown in Table 3. For another example, the PCI range information may include range information for each SNPN ID as shown in Table 4.

TABLE 3

PCI range for all of the SNPN

| IE/Group Name | Presence | Range | IE type and reference | Semantics description |
|---|---|---|---|---|
| PCI Range for SNPN | O | | | |

TABLE 4

PCI range per SNPN ID

| IE/Group Name | Presence | Range | IE type and reference | Semantics description |
|---|---|---|---|---|
| PCI Range list for SNPN | O | | | |
| >PCI Range list for SNPN item | | 1 ... <maxSNPN ID> | | |
| >>SNPN ID | | | | |
| >>PCI Range | | | | |

Referring to FIG. 4C, the method 400 may optionally include step 450: configuring the PCI information based on at least one of a list of information. In one implementation, the PCI information may be configured as common for all SNPN cells. In another implementation, the PCI information may be configured for an SNPN ID, a public land mobile network identifier (PLMN ID), or a combination of an SNPN ID and a PLMN ID. In another implementation, the PCI information may be configured for a frequency as common for all SNPN cells on the frequency. In another implementation, the PCI information may be configured for a frequency for an SNPN ID, a PLMN ID, or a combination of an SNPN ID and a PLMN ID on the frequency.

In another implementation, the PCI information may be configured in a positive way. The positive way may mean a list of PCIs which are allowed and capable cell. For example, the PCI information may be configured to include a PCI or a list of PCIs of an SNPN capable cell.

In another implementation, the PCI information may be configured in a negative way. The negative way may mean a list of PCIs which are not-allowed or non-capable cell. For example, the PCI information may be configured to include a PCI or a list of PCIs of an SNPN non-capable cell.

Referring to FIG. 4D, the method 400 may optionally include step 460: providing the SNPN ID information. In one implementation, the SNPN ID information may include more than one SNPN IDs for each cell, or for each PLMN and each cell. In another implementation, the SNPN ID information may include one or more SNPN ID for each PLMN.

Referring to step 420 in FIG. 4A, when a distributed unit sends a setup request or a configuration update message to a central unit, the distributed unit may indicate at least one of the following to the central unit:
- at least one served SNPN,
- at least one available SNPN,
- the PCI information for the SNPN, or
- the SMTC information for the SNPN.

Referring to step 430 in FIG. 4A, when a central unit sends a setup response or a configuration update message to a distributed unit, the central unit may indicate or update at least one of the following to the distributed unit:
- at least one served SNPN,
- at least one available SNPN,
- the PCI information for the SNPN, or
- the SMTC information for the SNPN.

Referring to FIG. 4E, the method 400 may optionally include step 470: sending paging information from a central unit to a distributed unit. In one implementation, the paging information comprises at least one of the following:
- the PCI information,
- the SNPN ID, or
- a list of at least one SNPN ID.

The present disclosure describes another embodiment of a method for transferring information of a closed access group (CAG) on an interface between a central unit (CU) and a distributed unit (DU). In one implementation, this embodiment may be implemented on a same network as the previous embodiment and work together with the previous embodiment. In another implementation, this embodiment may be implemented on a different network as the previous embodiment and may work independently from the previous embodiment. In another implementation, this embodiment may be implemented on a same network as the previous embodiment and may work parallel to the previous embodiment.

Figure 6A:
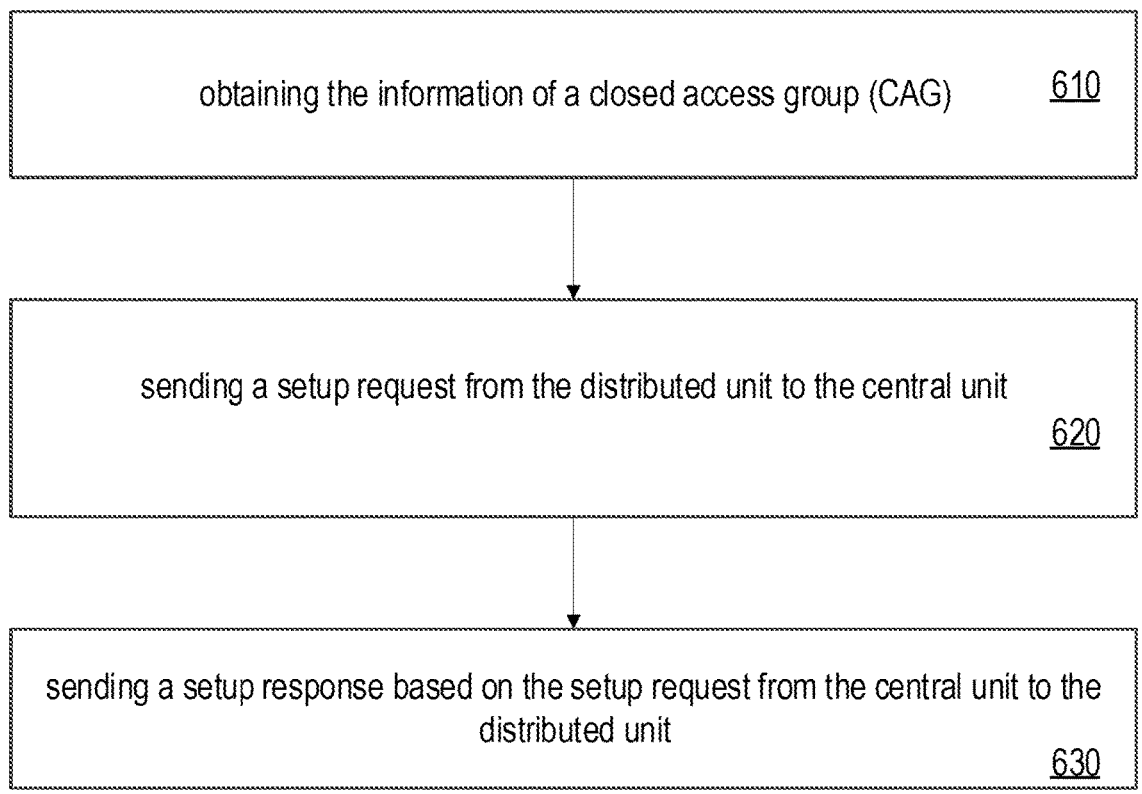
FIG. 6A shows a flow diagram of a method for wireless communication.

Referring to FIG. 6A, a method 600 for transferring information of a closed access group (CAG) on an interface between a central unit (CU) and a distributed unit (DU) may further include step 610: obtaining the information of a closed access group (CAG); step 620; sending a setup request from the distributed unit to the central unit; and step 630: sending a setup response based on the setup request from a central unit (CU) to a distributed unit (DU).

Referring to FIG. 5, a DU may include a gNB-DU 510, and a CU may include a gNB-CU 520. The gNB-DU 510 may send a F1 setup request 530 to the gNB-CU 520. The F1 setup request may include a first portion of the information of the CAG. For one example, the F1 setup request may include at least one elements in Table 1. The gNB-CU 520 may send a F1 setup response 540 to the gNB-DU 510. The F1 setup response may depend on the F1 setup request. The F1 setup response may include a second portion of the information of the CAG. For one example, the F1 setup response may include at least one elements in Table 2.

Referring to FIG. 6B, the method 600 may optionally include step 640: transferring an configuration update message on the interface between the central unit and the distributed unit. The configuration update message may include same or different information as the setup request or the setup response.

In step 610, as shown in Tables 1 and 2, the information of the CAG may include at least one of the following:
- CAG identifier (CAG ID) information for each public land mobile network (PLMN) for each served cells,
- CAG ID information for each PLMN for at least one neighbor cell,
- physical cell identifier (PCI) information for the CAG, or
- synchronisation signal block measurement timing configuration (SMTC) information for the CAG.

In one implementation, the PCI information for the CAG may include information for each CAG ID, or information for all CAG cells.

In another implementation, the PCI information for the CAG may include PCI range information, for example, a list of PCIs, a range of PCIs, or a list of ranges of PCIs. For one example, the PCI range information may include PCI range for all of the CAG as shown in Table 5. For another example, the PCI range information may include range information for each CAG ID as shown in Table 6.

TABLE 5

PCI range for all of the CAG

| IE/Group Name | Presence | Range | IE type and reference | Semantics description |
|---|---|---|---|---|
| PCI Range for CAG | O | | | |

TABLE 6

PCI range per CAG ID

| IE/Group Name | Presence | Range | IE type and reference | Semantics description |
|---|---|---|---|---|
| PCI Range list for CAG | O | | | |
| >PCI Range list for CAG item | | 1 ... \<maxCAG ID\> | | |
| >> CAG ID | | | | |
| >>PCI Range | | | | |

Referring to FIG. 6C, the method 600 may optionally include step 650: configuring the PCI information based on at least one of a list of information. In one implementation, the PCI information may be configured as common for all CAG cells. In another implementation, the PCI information may be configured for a CAG ID, a public land mobile network identifier (PLMN ID), or a combination of a CAG ID and a PLMN ID. In another implementation, the PCI information may be configured for a frequency as common for all CAG cells on the frequency. In another implementation, the PCI information may be configured for a frequency for a CAG ID, a PLMN ID, or a combination of a CAG ID and a PLMN ID on the frequency.

In another implementation, the PCI information may be configured in a positive way. The positive way may mean a list of PCI of allowed and capable cell. For example, the PCI information may be configured to include a PCI or a list of PCIs of a CAG capable cell.

In another implementation, the PCI information may be configured in a negative way. The negative way may mean a list of PCI of not-allowed or non-capable cell. For example, the PCI information may be configured to include a PCI or a list of PCIs of a CAG non-capable cell.

Referring to step 620 in FIG. 6A, when a distributed unit sends a setup request or a configuration update message to a central unit, the distributed unit may indicate at least one of the following to the central unit:
- at least one served CAG of each cell,
- at least one served CAG of each PLMN,
- at least one available CAG of each cell,
- at least one available CAG of each PLMN,
- the PCI information for the CAG, or
- the SMTC information for the CAG.

Referring to step 630 in FIG. 6A, when a central unit sends a setup response or a configuration update message to a distributed unit, the central unit may indicate or update at least one of the following to the distributed unit:
- at least one served CAG of each cell,
- at least one served CAG of each PLMN,
- at least one available CAG of each cell,
- at least one available CAG of each PLMN,
- the PCI information for the CAG, or
- the SMTC information for the CAG Referring to FIG. 6D, the method 600 may optionally include step 660: sending paging information from a central unit to a distributed unit. In one implementation, the paging information comprises at least one of the following:
- the PCI information,
- the CAG ID, or
- a list of at least one CAG ID.

In another embodiment, the method 400 may include one or more steps in the method 600. For example, a portion of or all steps in the method 600 may be implemented on a same network as the method 400 and may be a part of the method 400. It is understood that this embodiment is merely an example rather than a limitation.

Embodiment #2: Transfer Equivalent Stand-Alone Non-Public Network (eSNPN) List/SNPN ID, Allowed CAG List, or PCI Range Information on an Interface Between a Radio Access Network (RAN) Node and a Core Network (CN)

The present disclosure describes an embodiment of a method for transferring a list of at least one SNPN ID, a list of at least one allowed closed access group (CAG), and physical cell identifier (PCI) range information on an interface between a radio access network (RAN) node and a core network (CN) node.

Figure 7:
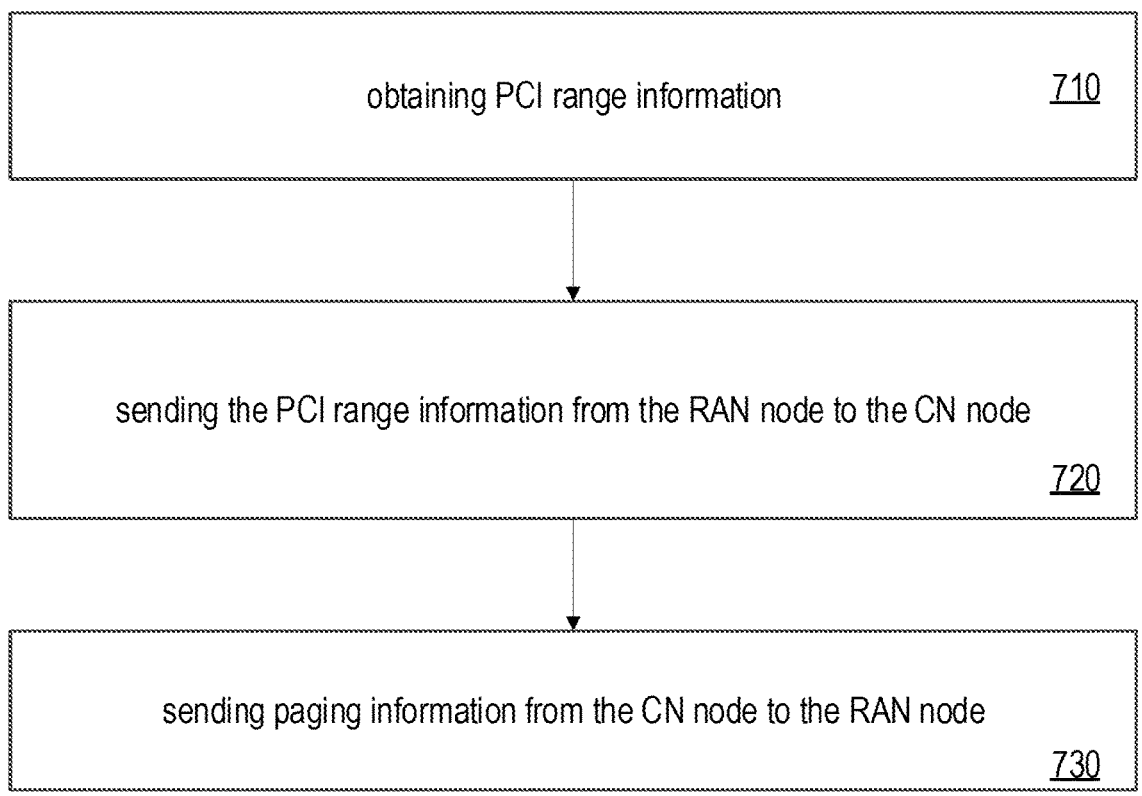
FIG. 7 shows a flow diagram of a method for wireless communication.

Referring to FIG. 7, one embodiment of a method 700 may include step 710: obtaining the PCI range information; step 720: sending the PCI range information from the RAN node to the CN node; and step 730: sending paging information from the CN node to the RAN node.

Figure 8:
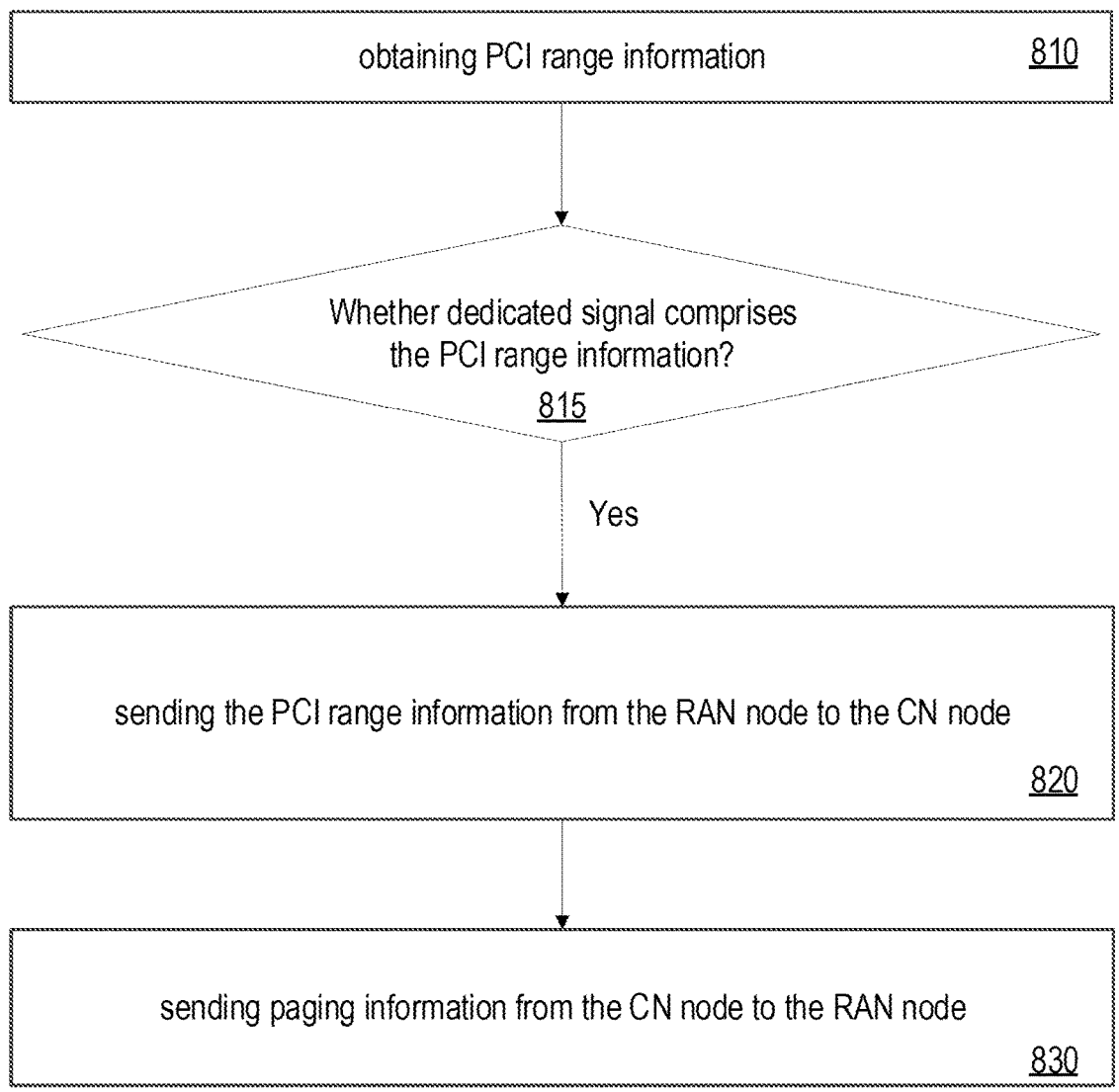
FIG. 8 shows a flow diagram of a method for wireless communication.

Referring to FIG. 8, another embodiment of a method 800 may include step 810: obtaining the PCI range information; step 815: determining whether dedicated signal includes the PCI range information; step 820: in response to determining that dedicated signal includes the PCI range information, sending the PCI range information from the RAN node to the CN node; and step 830: sending paging information from the CN node to the RAN node.

In one implementation, the PCI range information may include information for each SNPN ID, or information for all SNPN cells. Optionally, the PCI range Information may include a list of PCIs, a range of PCIs, or a list of ranges of PCIs.

In another implementation, the PCI range information may include a PCI range of each network identifier, or a PCI range for each network type. A network identifier may include an SNPN identifier, or a CAG identifier; and a network type may include an SNPN type, or a CAG type.

Optionally, the PCI information is provided based on at least one of the following:
- the PCI information is provided as common for all SNPN cells,
- the PCI information is provided for an SNPN ID, a public land mobile network identifier (PLMN ID), or a combination of an SNPN ID and a PLMN ID,
- the PCI information is provided for a frequency as common for all SNPN cells on the frequency, or
- the PCI information is provided for a frequency for an SNPN ID, a PLMN ID, or a combination of an SNPN ID and a PLMN ID on the frequency.

Figure 9A:
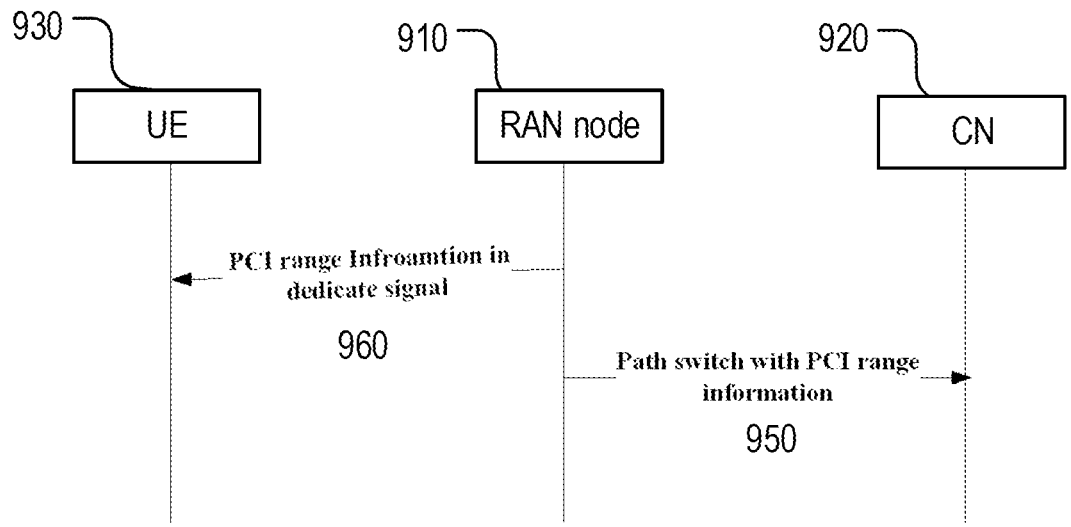
FIG. 9A shows a schematic diagram of one embodiment for transferring information between a radio access network (RAN) node and a core network (CN).

Referring to either Step 720 in FIG. 7 or Step 820 in FIG. 8, a RAN node may send PCI range information to a CN. As shown in FIG. 9A, in 950, a RAN node 910 may send a path switch with PCI range information to a CN 920. The RAN node 910 may indicate the PCI range information to the CN 920 in response to a determination that the RAN node indicates the PCI range information is included in the dedicated signal. Optionally in another implementation, in 960, the RAN node 910 may send the PCI range information in dedicated signal to a user equipment (UE) 930.

Figure 9B:
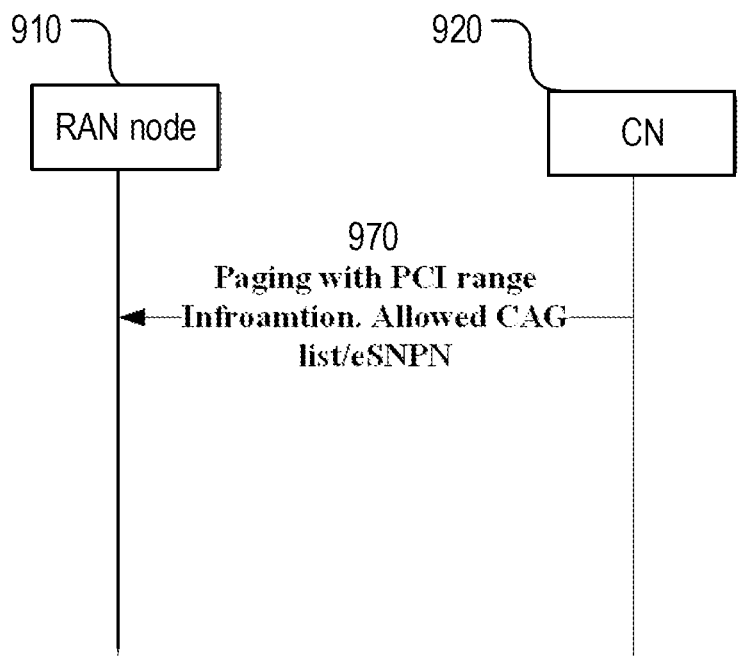
FIG. 9B shows a schematic diagram of another embodiment for transferring information between a radio access network (RAN) node and a core network (CN).

Referring to either Step 730 in FIG. 7 or Step 830 in FIG. 8, a CN node may send paging information to a RAN node. As shown in FIG. 9B, in 970, a CN node 920 may send paging information with PCI range information to a RAN node 910. The CN node 920 may indicate the PCI range information to the RAN node 910 when the paging information is sent to the RAN node. Optionally in another implementation, the paging information may include a list of allowed CAG or eSNPN.

Embodiment #3: Transfer eSNPN List/SNPN ID, Allowed CAG List, or PCI Range Information on an Interface Between Radio Access Network (RAN) Nodes The present disclosure describes an embodiment of a method for transferring a list of at least one SNPN ID, a list of at least one allowed closed access group (CAG), or physical cell identifier (PCI) range information on an interface between a source radio access network (RAN) node and a target RAN node.

In one implementation, the PCI range information may include information for each SNPN ID, or information for all SNPN cells. Optionally, the PCI range Information may include a list of PCIs, a range of PCIs, or a list of ranges of PCIs.

In another implementation, the PCI range information may include a PCI range of each network identifier, or a PCI range for each network type. A network identifier may include an SNPN identifier, or a CAG identifier; and a network type may include an SNPN type, or a CAG type.

Referring to FIG. 10A, the method 1000 may include step 1010: sending the list of at least one SNPN, the list of at least one allowed CAG, or the PCI range information from the source RAN node to the target RAN node. In one implementation during a handover procedure between the source RAN node and the target RAN node, Step 1010 may include sending the list of at least one SNPN, the list of at least one allowed CAG, or the PCI range information from the source RAN node to the target RAN node. In another implementation when the target RAN node retrieves user equipment (UE) context from the source RAN node, Step 1010 may include sending the list of at least one SNPN, the list of at least one allowed CAG, or the PCI range information from the source RAN node to the target RAN node.

Referring to FIG. 10B, the method 1000 may optionally include step 1020: sending new PCI range information from the target RAN node to a UE. Referring to FIG. 10C, the method 1000 may optionally include step 1030: sending paging information from a RAN node to one or more other RAN nodes according to the list of at least one SNPN, the list of at least one allowed CAG, or the PCI range information.

Referring to Step 1010 in FIG. 10A, a source node may send information to a target code, and the information may include the list of at least one SNPN, the list of at least one allowed CAG, or the PCI range information.

Figure 11:
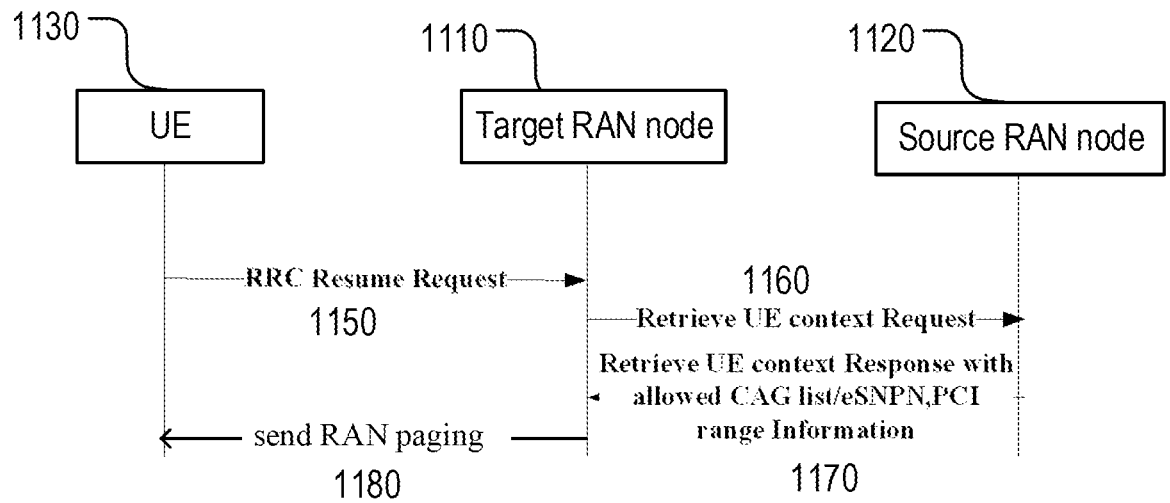
FIG. 11 shows a schematic diagram of one embodiment for transferring information between a target radio access network (RAN) node and a source RAN node.

Referring to FIG. 11, in 1170, when a target RAN node 1110 retrieves UE context from a source RAN node 1120, the source RAN node 1120 may indicate to the target RAN node 1110 the eSNPN list/SNPN ID, allowed CAG lit or PCI range information. Optionally in one implementation, before the target RAN node 1110 retrieves the UE context response, in 1160, the target RAN node 1110 may send the retrieve UE context request to the source RAN node 1120. Optionally in another implementation, in 1150, a UE 1130 may send RRC resume request to the target RAN node 1110. Optionally in another implementation, the target node 1110 may indicate new PCI information to the UE; and when the target RAN node 1110 fails to indicate the new PCI information to the UE 1130, in 1180, the target node 1110 may send RAN paging on the cells according to the eSNPN list/SNPN ID, the allowed CAG list, or the PCI range information.

Figure 12:
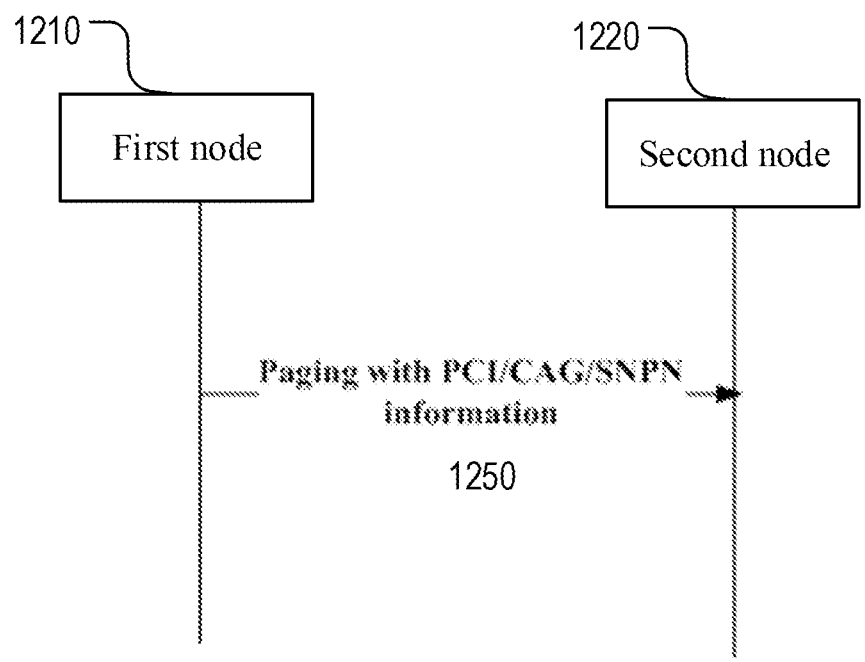
FIG. 12 shows a schematic diagram of one embodiment for transferring paging between a first node and a second node.

Referring to FIG. 12, in 1250, a first node 1210 may send paging information to a second node. The paging information may include PCI information, CAG information, or SNPN information. The first node 1210 and the second node 1220 may respectively include CU and DU, gNB1 and gNB2, CN and gNB, CU-user plan (UP) and CU-control plane (CP), CN and eLTE node, eLTE node 1 and eLTE node 2.

Embodiment #4: Transfer PCI Range Information in a Dedicated Signal Between a Radio Access Network (RAN) Node and a User Equipment (UE)

The present disclosure describes an embodiment of a method for transferring physical cell identifier (PCI) range information in dedicated signal between a radio access network (RAN) node and a user equipment (UE).

Figure 13:
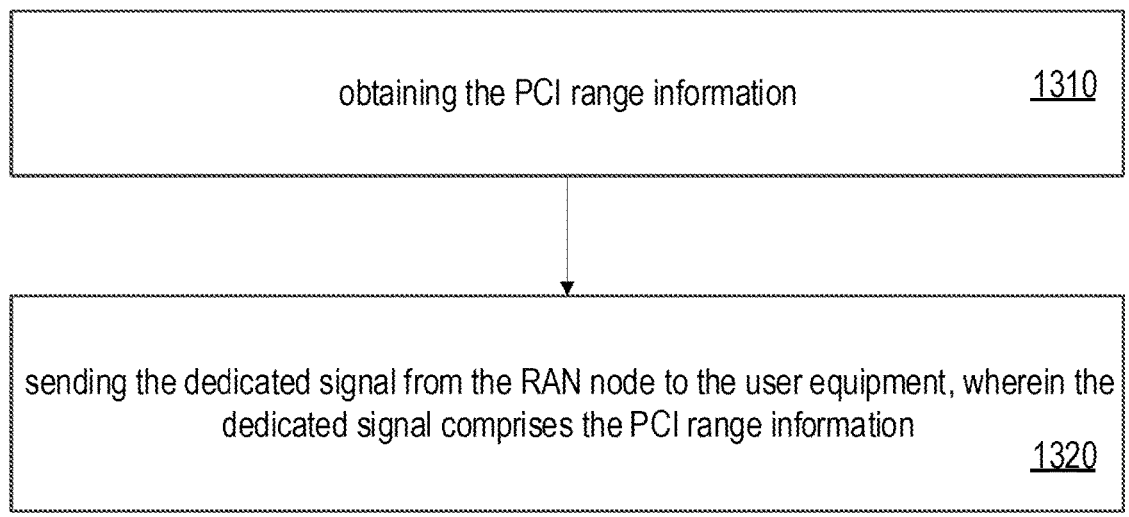
FIG. 13 shows a flow diagram of a method for wireless communication.

Referring to FIG. 13, the method 1300 may include step 1310: obtaining the PCI range information; step 1320: sending the dedicated signal from the RAN node to the user equipment, wherein the dedicated signal comprises the PCI range information.

In one implementation, the dedicated signal may include a radio resource control (RRC) release message (or RRCRelease Msg). Optionally in another implementation, the PCI range information may include a PCI range for an intra-frequency or at least one inter-frequencies.

One example of RRC release message may include a PCI range on a current frequency for an intra-frequency:

```
-- ASN1START
-- TAG-RRCRELEASE-START
RRCRelease ::=                    SEQUENCE {
    rrc-TransactionIdentifier    ,
    criticalExtensions            CHOICE {
        rrcRelease                RRCRelease-IEs,
        criticalExtensions Future SEQUENCE { }
    }
}
RRCRelease-IEs ::=                SEQUENCE{
...
    nonCriticalExtension          RRCRelease-v1540-IEs
OPTIONAL
}
RRCRelease-v1540-IEs ::=          SEQUENCE {
    waitTime                      RejectWaitTime
OPTIONAL, -- Need N
    nonCriticalExtension          RRCRelease-v16xy-IEs
OPTIONAL
}
RRCRelease-v16xy-IEs ::=          SEQUENCE {
physCellIdRangePhysCellIdRange    OPTIONAL, --Cond NPN
    nonCriticalExtension          SEQUENCE { }
OPTIONAL
}
PhysCellIdRange ::=SEQUENCE {
startPhysCellId,
rangeENUMERATED {
n2,n4, n8, n12, n16, n24, n32, n48, n64, n84,
n96, n128, n168, n252, n504, n1008,spare2,
spare1} }
...
-- TAG-RRCRELEASE-STOP
-- ASN1STOP
```

Another example of RRC release message may include a PCI range on at least one different frequency, i.e., for at least one inter-frequencies:

```
-- ASN1START
-- TAG-RRCRELEASE-START
RRCRelease ::=                    SEQUENCE {
    rrc-TransactionIdentifier    ,
    criticalExtensions            CHOICE {
        rrcRelease                RRCRelease-IEs,
        criticalExtensions Future SEQUENCE { }
    }
}
RRCRelease-IEs ::=                SEQUENCE {
...
    nonCriticalExtension          RRCRelease-v1540-IEs
OPTIONAL
}
RRCRelease-v1540-IEs ::=          SEQUENCE {
waitTime                          RejectWaitTime
OPTIONAL, -- Need N
    nonCriticalExtension          RRCRelease-v16xy-IEs
OPTIONAL
}
RRCRelease-v16xy-IEs ::=          SEQUENCE {
physCellIdRangeListPhysCellIdRangeList    OPTIONAL, --Cond NPN
    nonCriticalExtension          SEQUENCE { }
OPTIONAL
}
PhysCellIdRangeList ::= SEQUENCE (SIZE (1..maxFreq)) OF PhysCellIdRange OPTIONAL, --Cond NPN
PhysCellIdRange ::=SEQUENCE {
    carrierFreq                   ARFCN-ValueNR,
startPhysCellId,
rangeENUMERATED {
n2, n4, n8, n12, n16, n24, n32, n48, n64, n84,
n96, n128, n168, n252, n504, n1008,spare2,
spare1} }
}
...
-- TAG-RRCRELEASE-STOP
-- ASN1STOP
```

As shown in the above examples, a size of the PCI range may be enumerated, for example 2 cells for n2, 4 cells for n4, 48 cells for n48, and etc. The PCI range may include a list of PCIs, a range of PCIs, or a list of ranges of PCIs. For one example, when the cell begins at cell 1 and a size of a PCI range is n2, the PCI range is cell 1 and cell 2. For another example, when the cell begins at cell 3 and a size of a PCT range is n4, the PCI range is cell 2, cell 3, cell 4, and cell 5.

Embodiment #5: A User Equipment (UE) Assists Cell Reselection Based on PCI Range Information Received in a Dedicated Signal The present disclosure describes an embodiment of a method for receiving PCI range information in dedicated signal by a user equipment (UE). The method may be performed by a UE, for example, a smart phone.

Referring to FIG. 14, the method 1400 may include step 1410: receiving, by a user equipment (UE), a dedicated signal comprising physical cell identifier (PCI) range information; step 1420: replacing, by the UE, previously received PCI range information by the PCI range information in the dedicated signal, and step 1430: using, by the UE, the PCI range information in the dedicated signal to assist cell reselection, and step 1440: determining, by the UE, whether a preset condition has occurred; step 1450: in response to determining that the preset condition has occurred, setting, by the UE, the PCI range information in the dedicated signal as invalid.

Referring to step 1420 and/or step 1430, when any of the preset conditions has not occurred, the UE is configured to replace any previously received PCI range information with the PCI range information in the dedicated signal, and is configured to use the PCI range information in the dedicated signal to assist the cell reselection.

Figure 17:
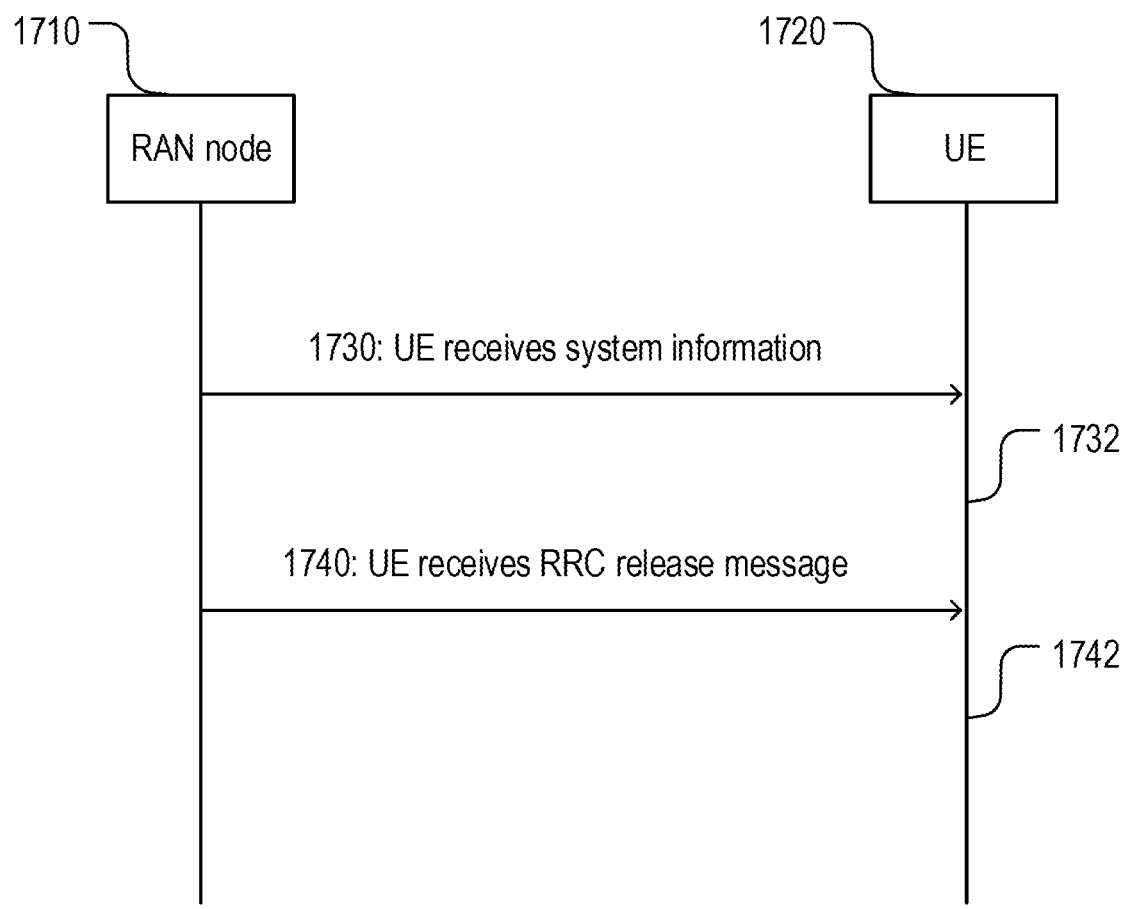
FIG. 17 shows a schematic diagram of one embodiment for transferring information between a radio access network (RAN) node and a user equipment (UE).

Referring to FIG. 17, the present disclosure describes one implementation for step 1420. In 1730, a UE 1720 may receive system information. The system information may be sent by a RAN node 1710. For example, the system information may include a PCI range 1 on a first frequency (f1) and a PCI range 2 on a second frequency (f2). At 1732, the present PCI range information for the UE may include the PCI range 1 on f1 and PCI range 2 on f2.

In 1740, the UE may receive dedicated signal as RRC release message. The RRC release message may be sent by the RAN node 1710. For example, the RRC release message may include a PCI range 3 on f1 and a PCI range 4 on f2. In response to receiving the dedicated signal, the UE may delete or ignore the previously received PCI range 1 on f1 and PCI range 2 on f2, and may replace the present PCI range information with the PCI range 3 on f1 and PCI range 4 on f2. Then, the UE may use the PCI range 3 on f1 and PCI range 4 on f2 for the cell reselection on f1 and f2 respectively.

Referring to FIG. 15, step 1430 of using, by the UE, the PCI range information in the dedicated signal to assist cell reselection may include step 1510: setting, by the UE, a range of PCIs in the PCI range information as candidate cells; step 1520: obtaining, by the UE, ranking information for each cell in the candidate cells; step 1530: ranking, by the UE, the candidate cells based on the ranking information and check the accessibility from the best ranked cell, ignore the cell from the candidates to obtain modified candidate cells when it fails the accessibility check; and step 1540: obtaining, by the UE, a cell with best rank in the modified candidate cells and matched private network ID (e.g., SNPN ID or CAG ID) as the cell reselection.

Referring to step 1520 in FIG. 15, the ranking information may include one or more physical and/or environmental parameters for a cell. For example, the ranking information may include a physical signal strength and signal quality of the cell.

Referring to step 1530 in FIG. 15, in one implementation, when a UE performs step 1530 and finds any unsuitable cell, the UE may record the status of the unsuitable cell, for example setting up a status flag for the unsuitable cell. Then, the UE may exclude the known unsuitable cell from the candidate cells during ranking process to save time. In another implementation, the UE may exclude the known unsuitable cell from obtaining ranking information to save time and improve efficiency.

An unsuitable cell may include any cell not in member cells of a stand-alone non-public network (SNPN), may also include any cell not in the member cells of an allowed closed access group (CAG), or may include any cell not allowed to access by the UE. Referring to FIG. 16A, step 1530 may optionally further include step 1610: for any CAG cell that is known by the UE not to be a CAG member cell, excluding the CAG cell from the candidate cells during ranking the candidate cells. Referring to FIG. 16B, step 1530 may optionally further include step 1620: for any SNPN cell that is known by the UE not to be a member cell of the SNPN, excluding the SNPN cell from the candidate cells during ranking the candidate cells. Referring to FIG. 16C, step 1530 may optionally further include step 1630: for any SNPN cell that is known by the UE not allowed to access, excluding the SNPN cell from the candidate cells during ranking the candidate cells.

Figure 18A:
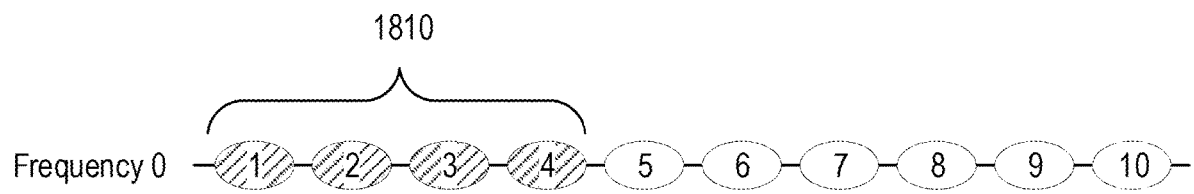
FIG. 18A shows a schematic diagram of one embodiment for a user equipment using physical cell identifier (PCI) range information to assist intra-frequency cell reselection.
Figure 18B:
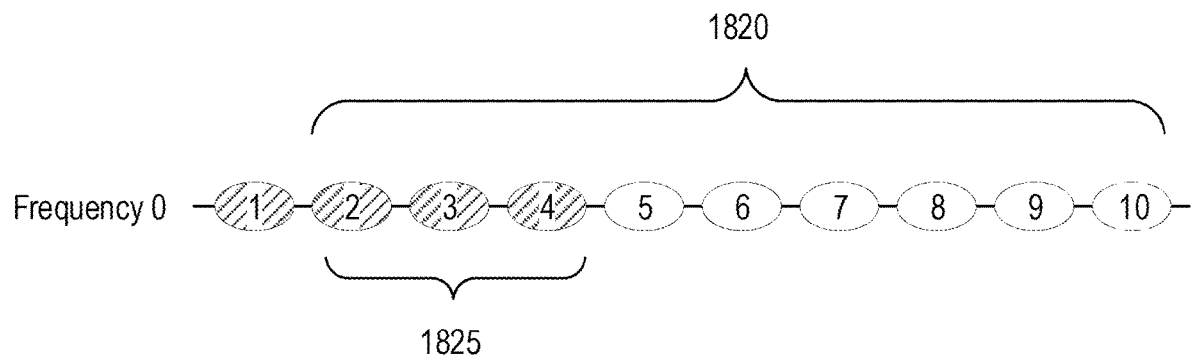
FIG. 18B shows a schematic diagram of one embodiment for a user equipment using physical cell identifier (PCI) range information to assist intra-frequency cell reselection.
Figure 18C:
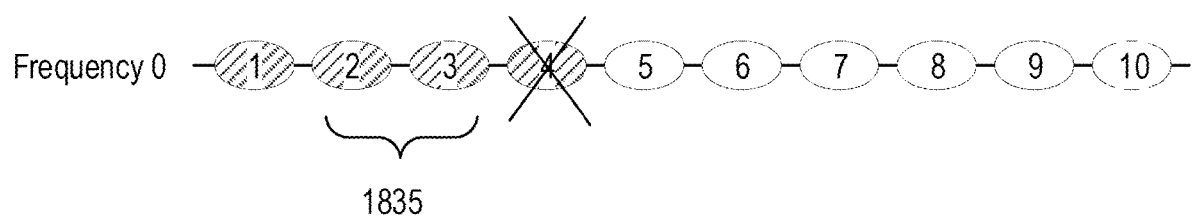
FIG. 18C shows a schematic diagram of one embodiment for a user equipment using physical cell identifier (PCI) range information to assist intra-frequency cell reselection.

Referring to FIGS. 18A-18C, the present disclosure describes one example of the method 1400 for a UE which is configured to use PCI range information to assist intra-frequency cell reselection. In FIG. 18A, the UE may receive a PCI range 1810 in PCI range information of from 1 to 4 (i.e., PCI=1, 2, 3, and 4) on a current frequency (for example, frequency 0) from cell 1 which enters into an idle or inactive state. The present PCI range on the UE may be the PCI range from 1 to 4.

Referring to FIG. 18B, the UE may trigger an intra-frequency reselection and the UE may detect a range 1820 of cells from 2 to 10 (i.e., PCI=2, 3, 4, 5, 6, 7, 8, 9, and 10). The UE may set the PCI range in the PCI range information as candidate cells, and thus set the PCI range from cell 2 to cell 4 ((i.e., PCI=2, 3, and 4) as the candidate cells 1825 because the detected cell 2, cell 3, and cell 4 are in the PCI range 1810 in the PCI range information.

After the UE sets the candidate cells 1825, the UE may obtain ranking information for each cell in the candidate cells 1825. For example, the UE may obtain or calculate the ranking information of cell 2, cell 3, and cell 4, and may find that cell 4 is highest ranked. The UE may read a master information block/system information block 1 (MIB/SIB1). For example, referring to FIG. 18C, when the UE obtains that cell 4 does not broadcast a matched network ID, the UE may ignore cell 4 or remove cell 4 from the candidate cells to obtain modified candidate cells 1835, and then the UE may move on to evaluate reselection based on ranking information from the modified candidate cells 1835, for this example, between cell 2 and cell 3.

Optionally, in one implementation, when the UE reselects cell 2 and triggers the intra-frequency reselection, the UE may exclude cell 4 from the candidate cells during ranking the candidate cells, because cell 4 is known by the UE not to be a member cell of the SNPN. In this implementation, the UE only obtain or calculate ranking information for cell 1 and cell 3.

Figure 19A:
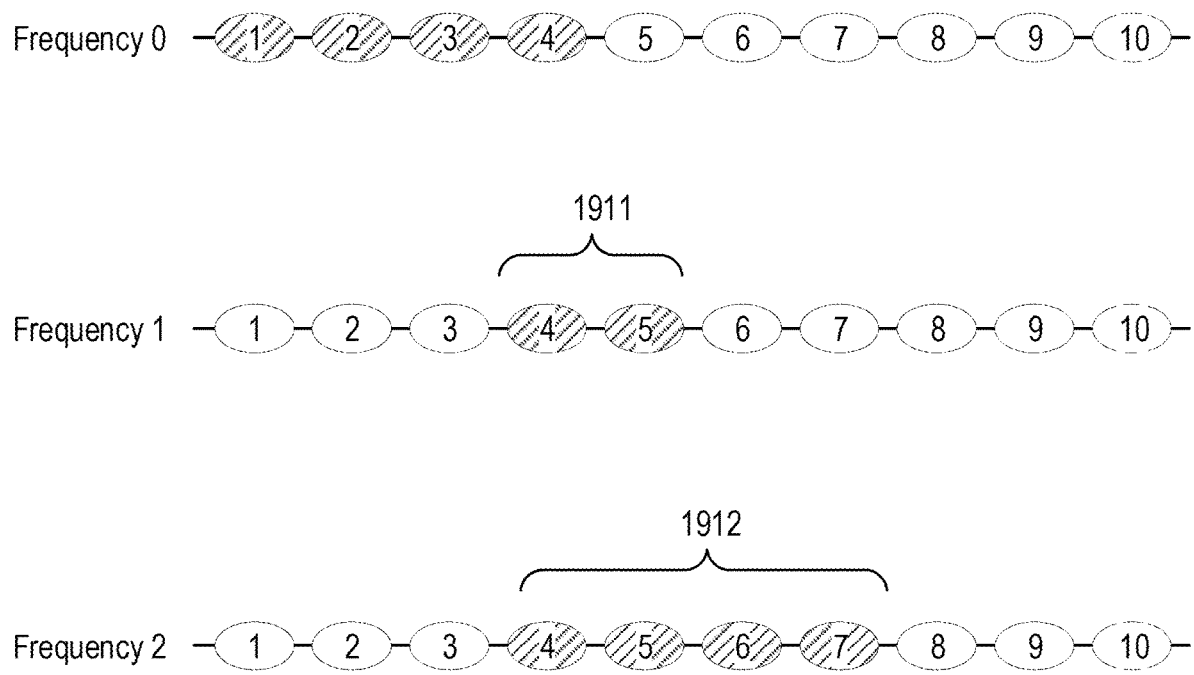
FIG. 19A shows a schematic diagram of one embodiment for a user equipment using physical cell identifier (PCI) range information to assist inter-frequency cell reselection.
Figure 19B:
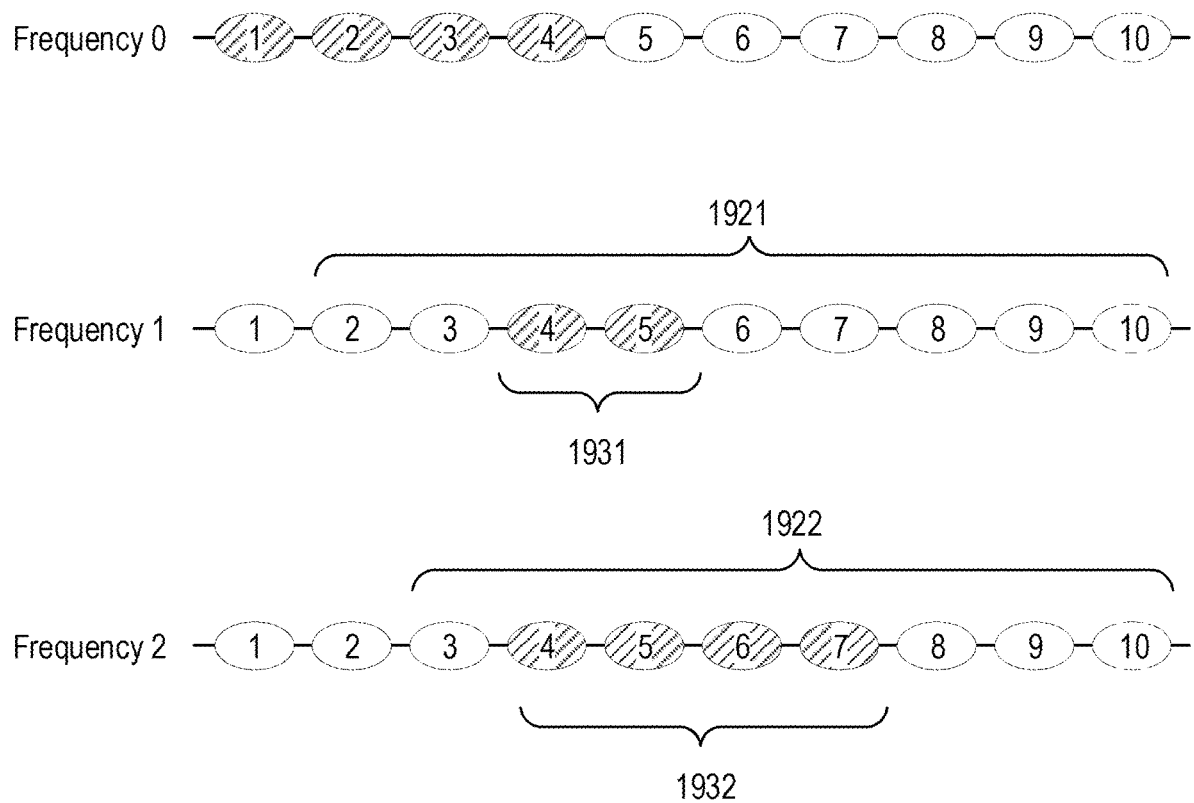
FIG. 19B shows a schematic diagram of one embodiment for a user equipment using physical cell identifier (PCI) range information to assist inter-frequency cell reselection.

Referring to FIGS. 19A-19B, the present disclosure describes one example of the method 1400 for a UE, which uses PCI range information to assist inter-frequency cell reselection. In FIG. 19A, the UE may receive PCI range information from cell 1 on a frequency 0. The PCI range information may include a PCI range 1911 from 4 to 5 (i.e., PCI=4 and 5) on a frequency 1 and a PCI range 1912 from 4 to 7 (i.e., PCI=4, 5, 6, and 7) on a frequency 2. Cell 1 on the frequency 0 may enter into an idle or inactive state. The present PCI range on the UE may be the PCI range 1911 on the frequency 1 and the PCI range 1912 on the frequency 2.

Referring to FIG. 19B, the UE may trigger an inter-frequency reselection and the UE may detect a range 1921 of cells from 2 to 10 (i.e., PCI=2, 3, 4, 5, 6, 7, 8, 9, and 10) on the frequency 1 and a range 1922 of cells from 3 to 10 (i.e., PCI=3, 4, 5, 6, 7, 8, 9, and 10) on the frequency 2. On the frequency 1, the UE may set cell 4 and cell 5 as candidate cells, because the detected cell 4 and cell 5 are in the PCI range 1911 in the PCI range information. On the frequency 2, the UE may set cell 4, cell 5, cell 6, and cell 7 as candidate cells, because the detected cell 4, cell 5, cell 6, and cell 7 are in the PCI range 1912 in the PCI range information.

Referring to step 1420 in FIG. 14, the preset condition may include whether a timer (for example, a validity timer) expires, whether a new public land mobile network (PLMN) or SNPN selection is performed on a request by a non-access stratum (NAS), or whether the UE changes a current state.

Figure 20A:
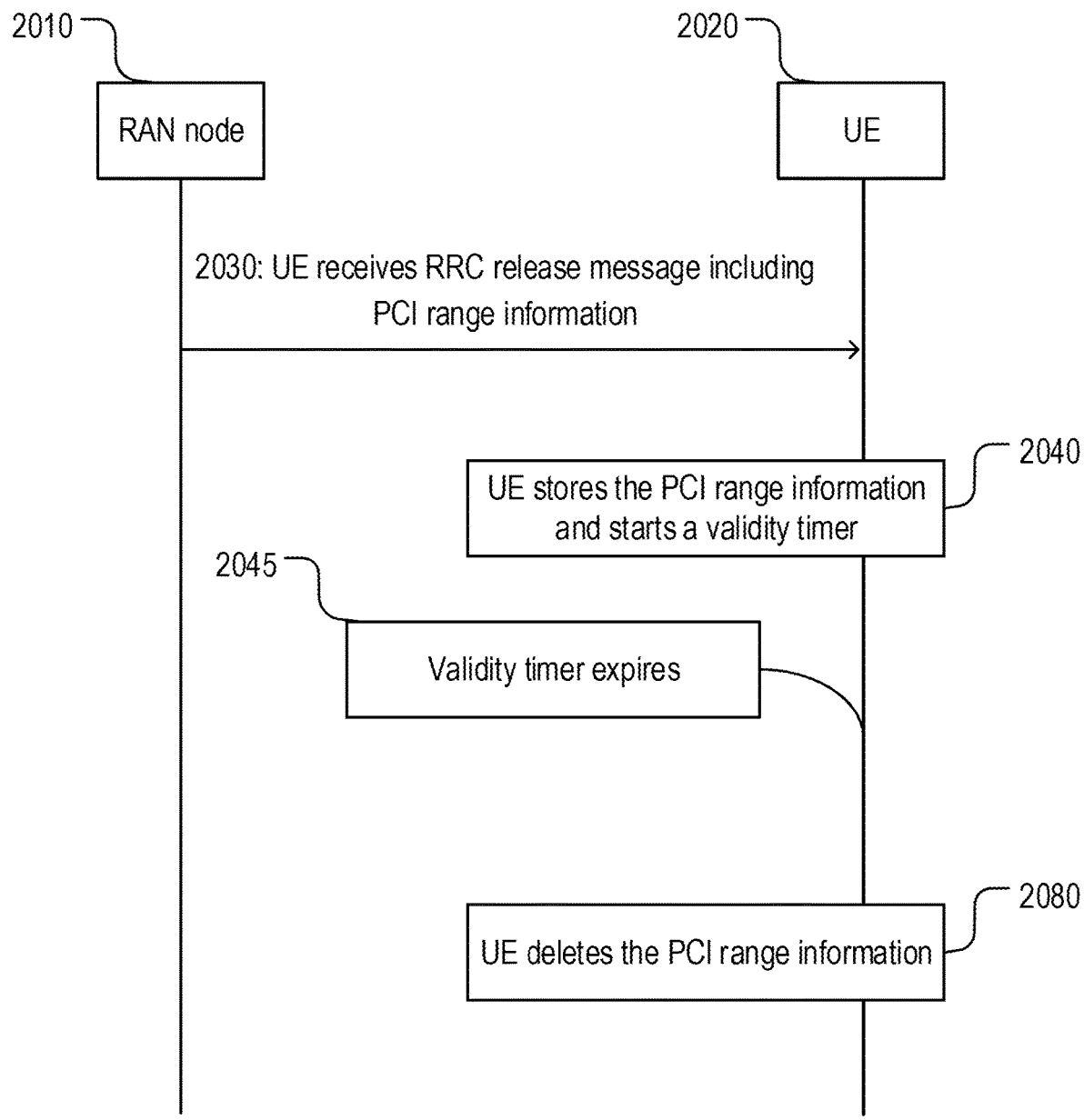
FIG. 20A shows a schematic diagram of one embodiment for a user equipment determining whether a validity timer expires.

FIG. 20A shows one example wherein the UE determines whether a validity timer expires. In 2030, a UE 2020 may receive a RRC release message. The RRC release message may include PCI range information. The RRC release message may be sent by a RAN node 2010. In response to receiving the RRC release message, in 2040, the UE may store the PCI range information and begin/start a timer (or a validity timer). The UE may include a timer threshold, which may be a per-determined value or an adjustable value based on current conditions of the UE and/or the RAN node. The current conditions may include a data transmission rate, an idle rate, etc. The timer threshold may be, for example but not limited to, one millisecond, ten milliseconds, one second, and ten seconds. In 2045, when the timer reaches the timer threshold, the timer expires. In 2080, in response to determining that the timer expires, the UE may delete the PCI range information.

Figure 20B:
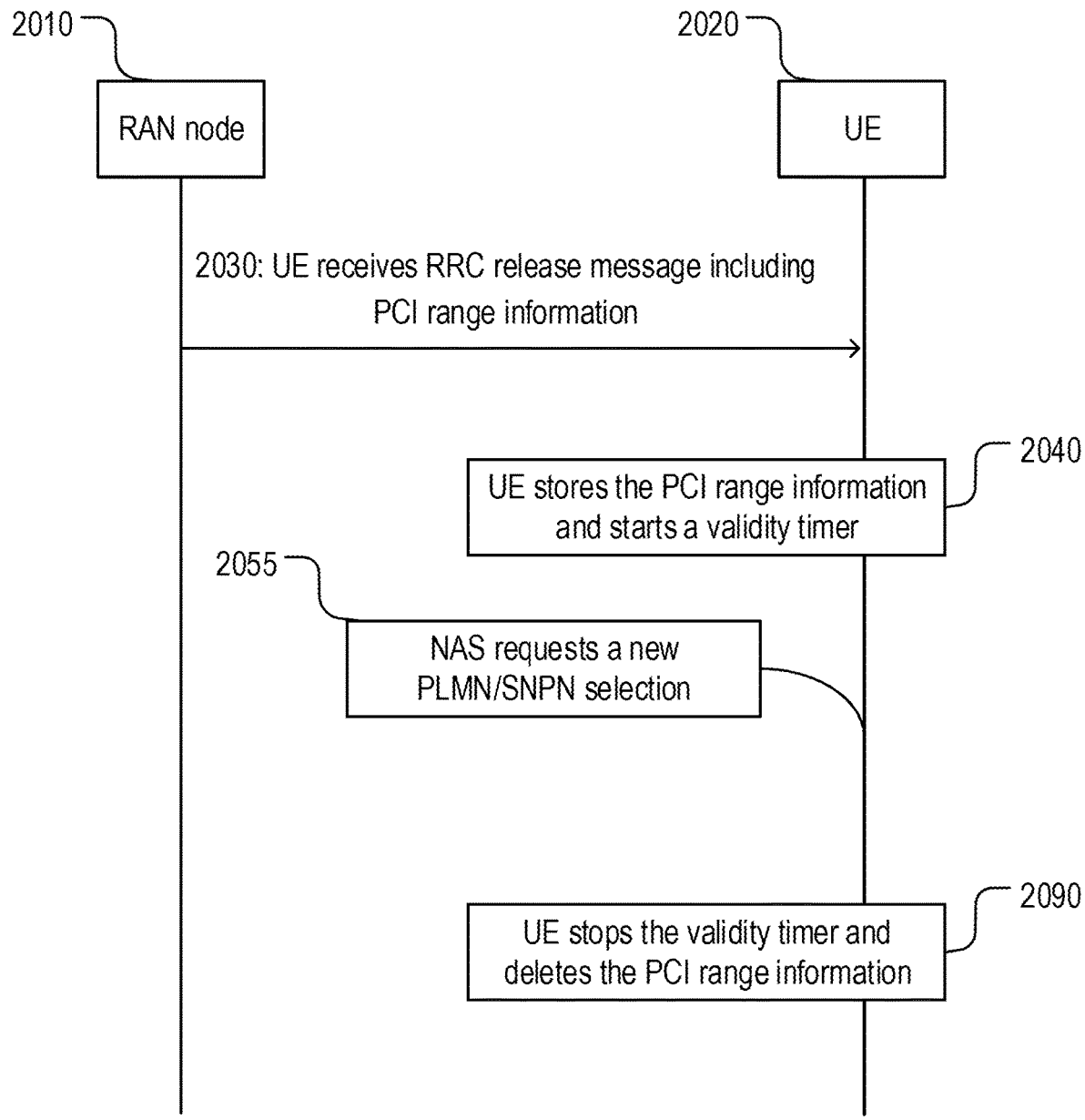
FIG. 20B shows a schematic diagram of one embodiment for a user equipment determining whether a new public land mobile network (PLMN) or stand-alone non-public network (SNPN) selection is performed on a request by a non-access stratum (NAS).

FIG. 20B shows one example wherein the UE determines whether a new public land mobile network (PLMN) or SNPN selection is performed on a request by a non-access stratum (NAS). In 2030, the UE 2020 may receive a RRC release message. The RRC release message may include PCI range information. The RRC release message may be sent by a RAN node 2010. In response to receiving the RRC release message, in 2040, the UE may store the PCI range information and begin/start a timer (or a validity timer). In 2055, the UE may receive a PLMN/SNPN selection from a NAS layer, and the new PLMN/SNPN selection may be requested by the NAS. In 2090, in response to determining that a new PLMN/SNPN selection is requested from the NAS, the UE may stop the validity timer and delete the PCI range information.

Figure 20C:
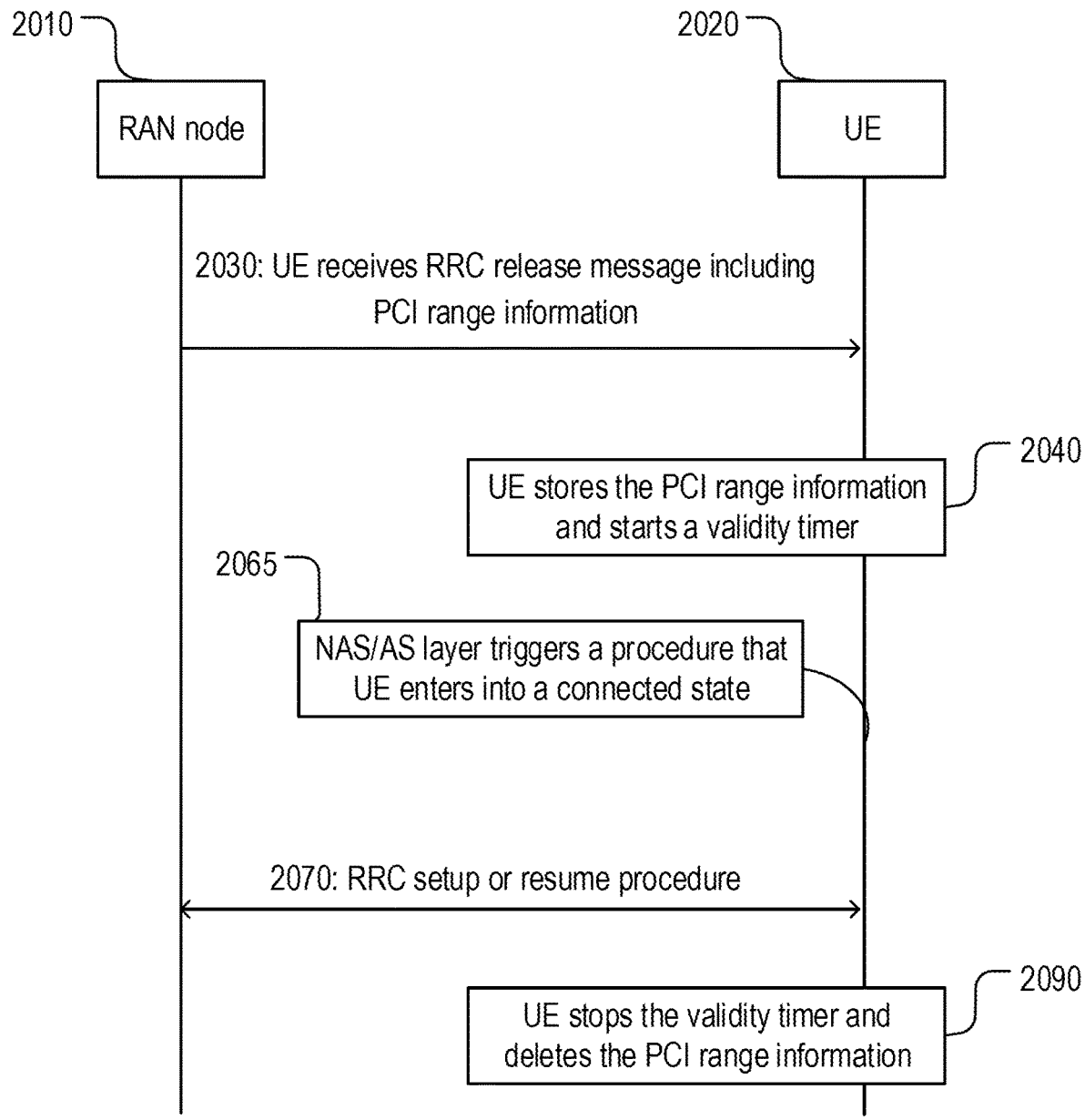
FIG. 20C shows a schematic diagram of one embodiment for a user equipment (UE) determining whether the UE changes a current state.

FIG. 20C shows one example wherein the UE determines whether the UE changes a current state. In 2030, the UE 2020 may receive a RRC release message. The RRC release message may include PCI range information. The RRC release message may be sent by a RAN node 2010. In response to receiving the RRC release message, in 2040, the UE may store the PCI range information and begin/start a timer (or a validity timer). In 2065, the UE may changes the current state, for example, entering into a RRC connected state in response to that NAS/AS layer triggers a procedure. In 2090, in response to determining that the UE changes the current state, the UE may stop the validity timer and delete the PCI range information. Optionally, in 2070, the UE 2020 may communicate with the RAN node 2010 related to RRC setup or resume procedure.

The present disclosure describes methods, apparatus, and computer-readable medium for wireless communication. The present disclosure addressed the issues with performing cell reselection and paging. The methods, devices, and computer-readable medium described in the present disclosure may facilitate the performance of cell reselection and paging. The methods, devices, and computer-readable medium described in the present disclosure may also reduce UE's power consumption and time needed to perform cell reselection and paging, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
transferring physical cell identifier (PCI) range information in a signal between a radio access network (RAN) node and a user equipment by performing:
sending the signal from the RAN node to the user equipment,
wherein the signal comprises the PCI range information, and
wherein the PCI range information comprises a list of ranges of PCIs for each of a plurality of public land mobile network identifiers (PLMN IDs), each range of PCIs for an intra-frequency or at least one inter-frequency.

2. The method of claim 1, wherein:
the signal comprises a radio resource control (RRC) release message.

3. A non-transitory computer program product comprising a computer-readable program medium code stored thereupon, the code, when executed by a processor, causing the processor to perform the method of claim 1.

4. The non-transitory computer program product of claim 3, wherein:
the signal comprises a radio resource control (RRC) release message.

5. A wireless communication apparatus comprising a processor and a memory, wherein, when the processor reads instructions from the memory, the processor is configured to perform:
receiving, by a user equipment, a signal form a radio access network (RAN) node, wherein the signal comprises physical cell identifier (PCI) range information; and
determining, by the user equipment, the PCI range information for cell reselection;
wherein the PCI range information comprises a list of ranges of PCIs for each of a plurality of public land mobile network identifiers (PLMN IDs), each range of PCIs for an intra-frequency or at least one inter-frequency.

6. The wireless communication apparatus of claim 5, wherein:
the signal comprises a radio resource control (RRC) release message.

* * * * *